Figure 6:
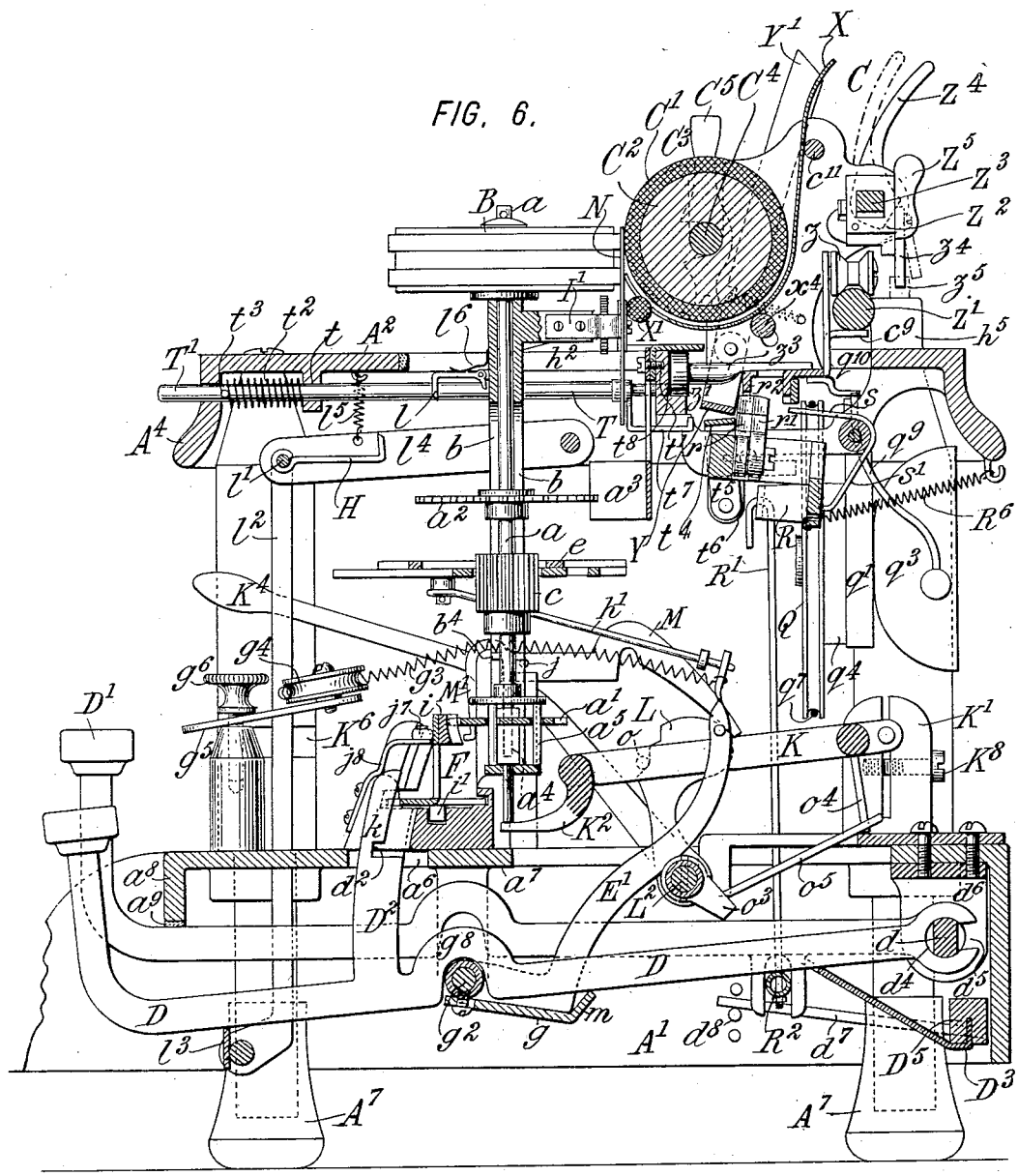

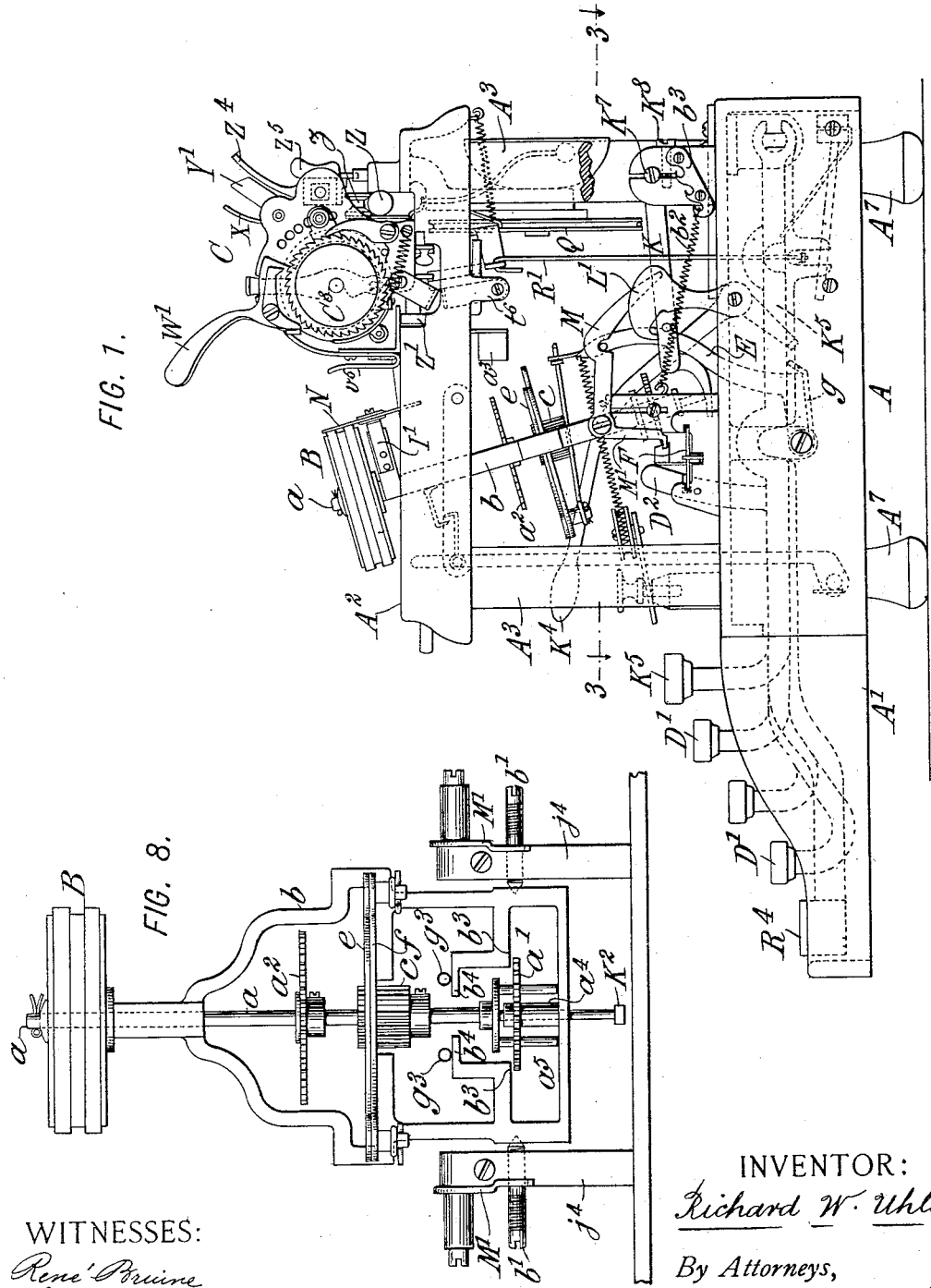

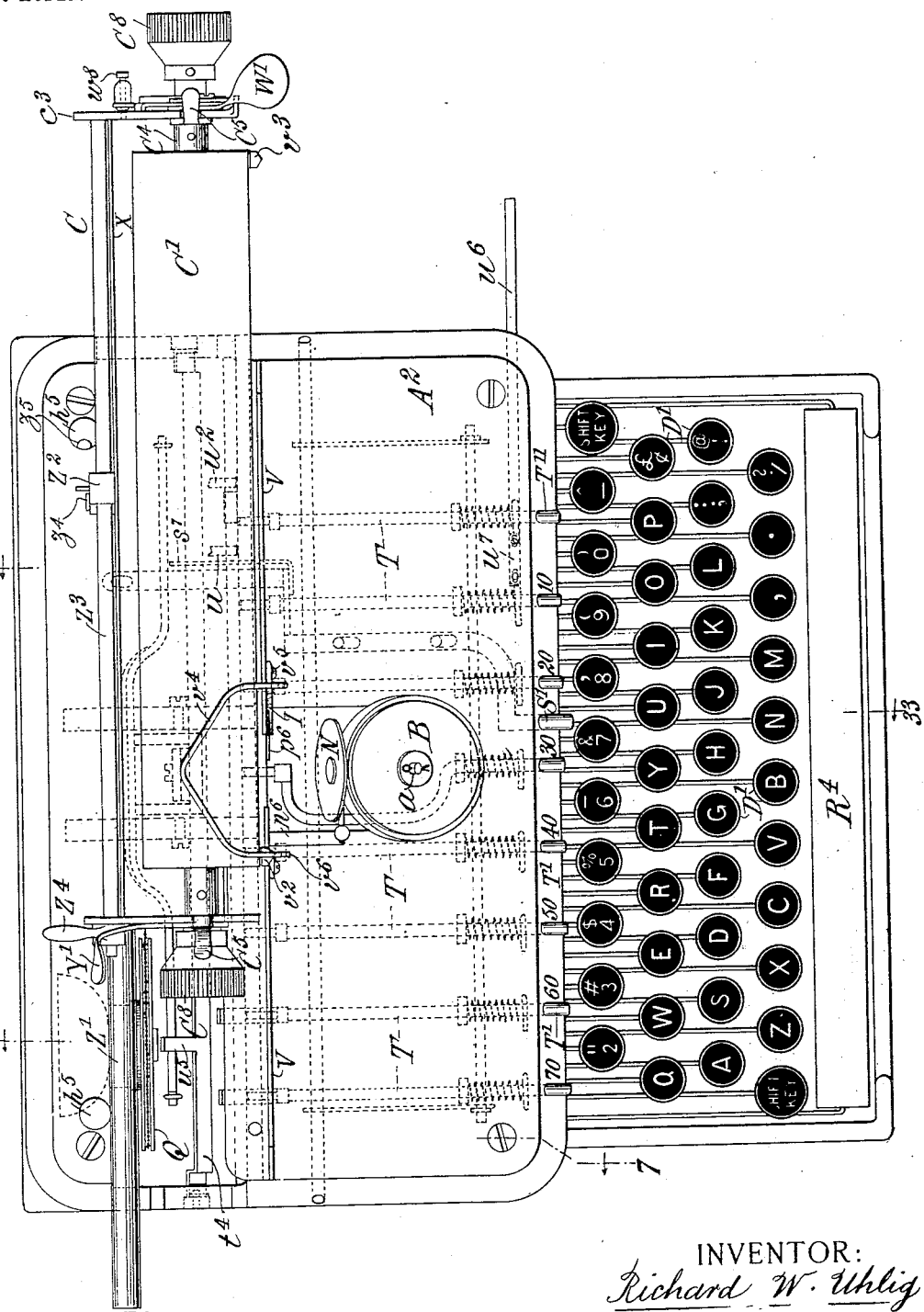

No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 3.
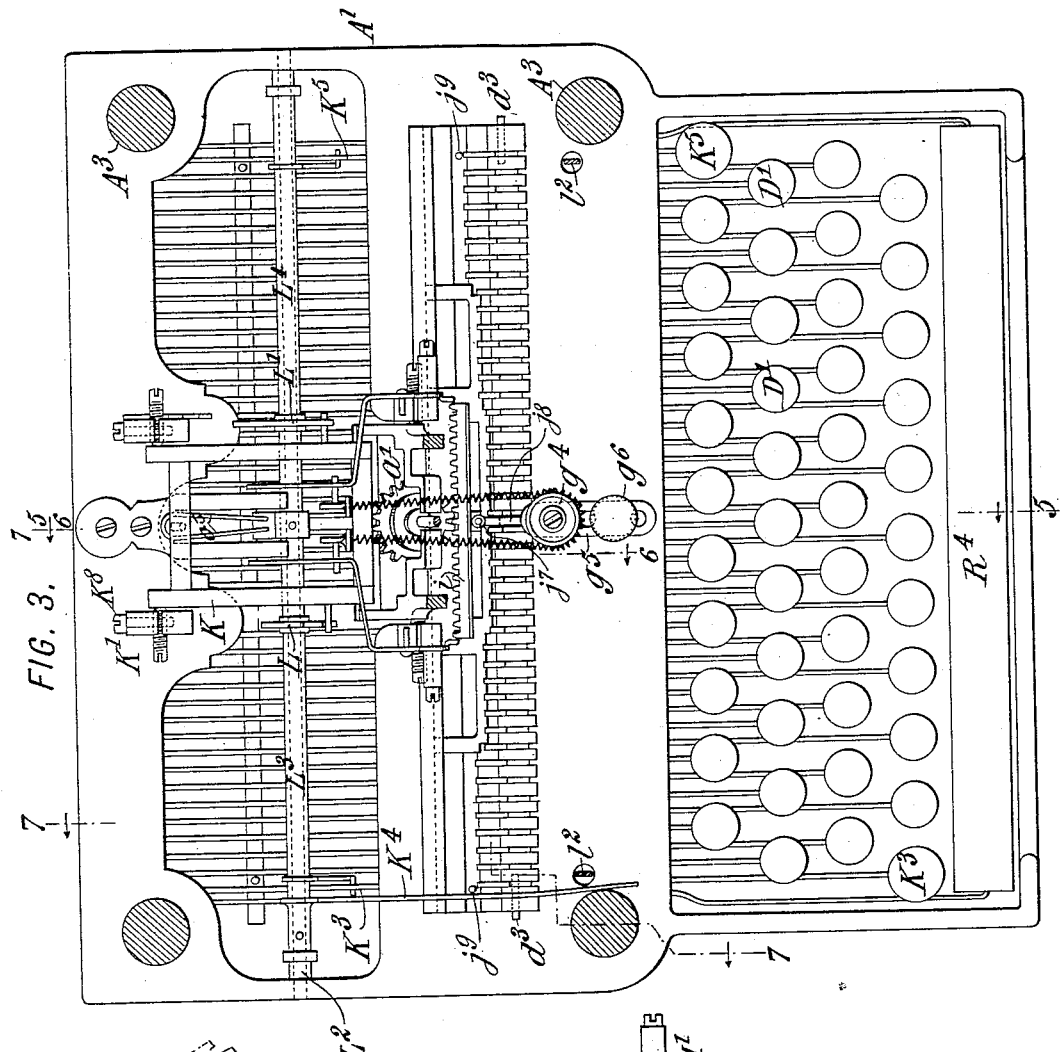
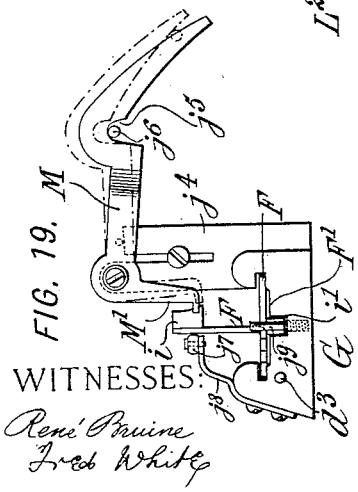
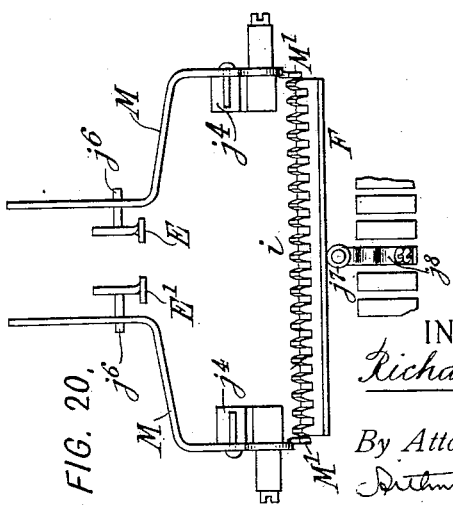
WITNESSES:
René Bruine
Fred White
INVENTOR:
Richard W. Uhlig,
By Attorneys, No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 4.
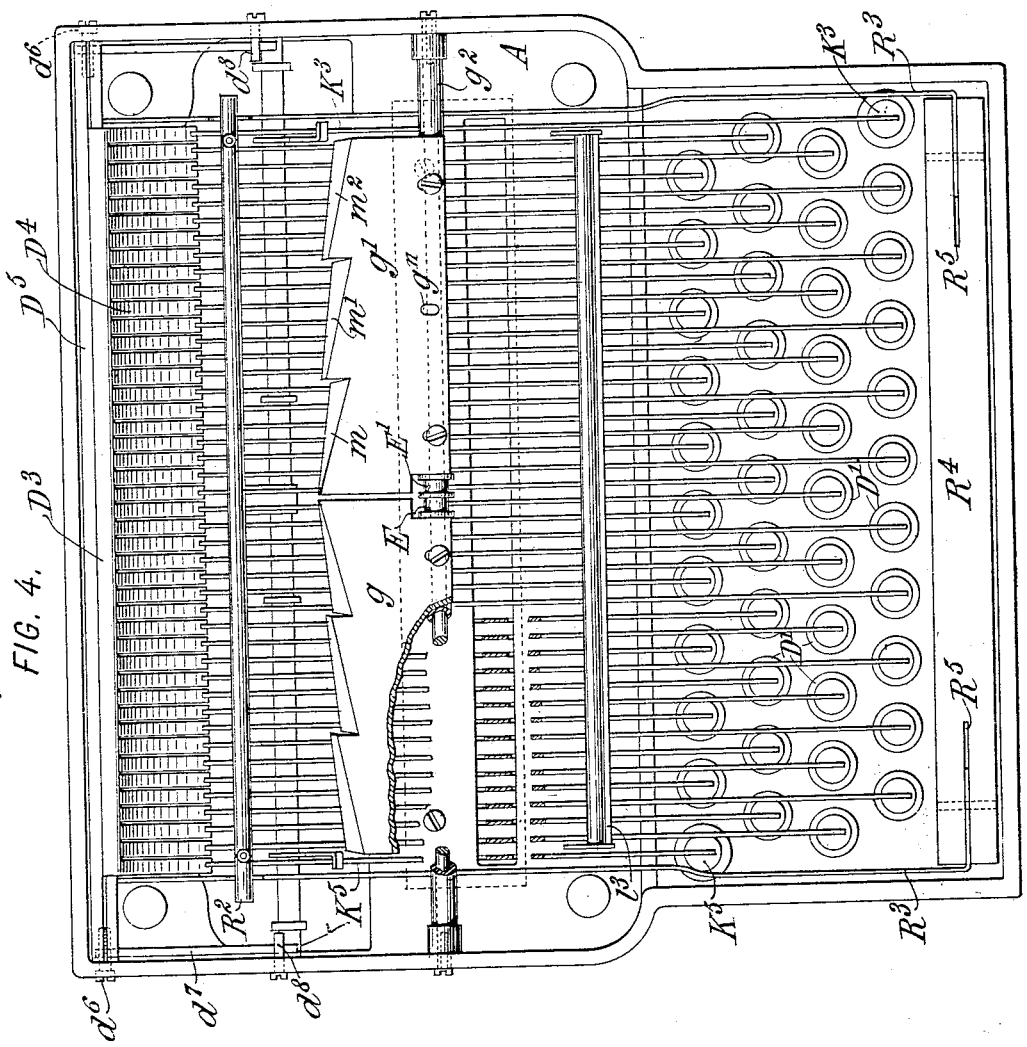
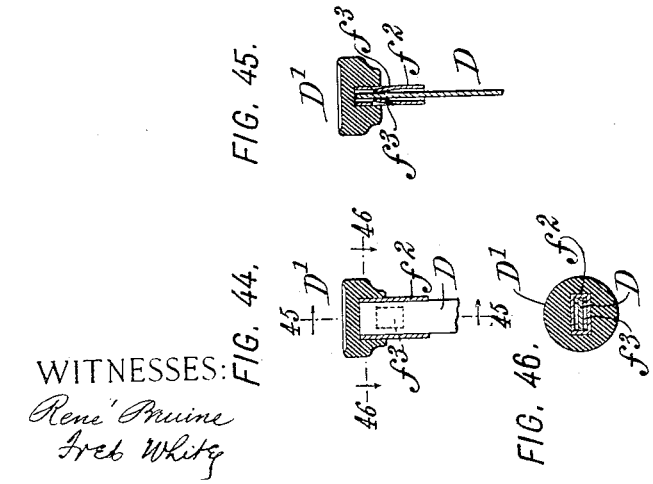
INVENTOR:
Richard W. Uhlig,
By Attorneys,

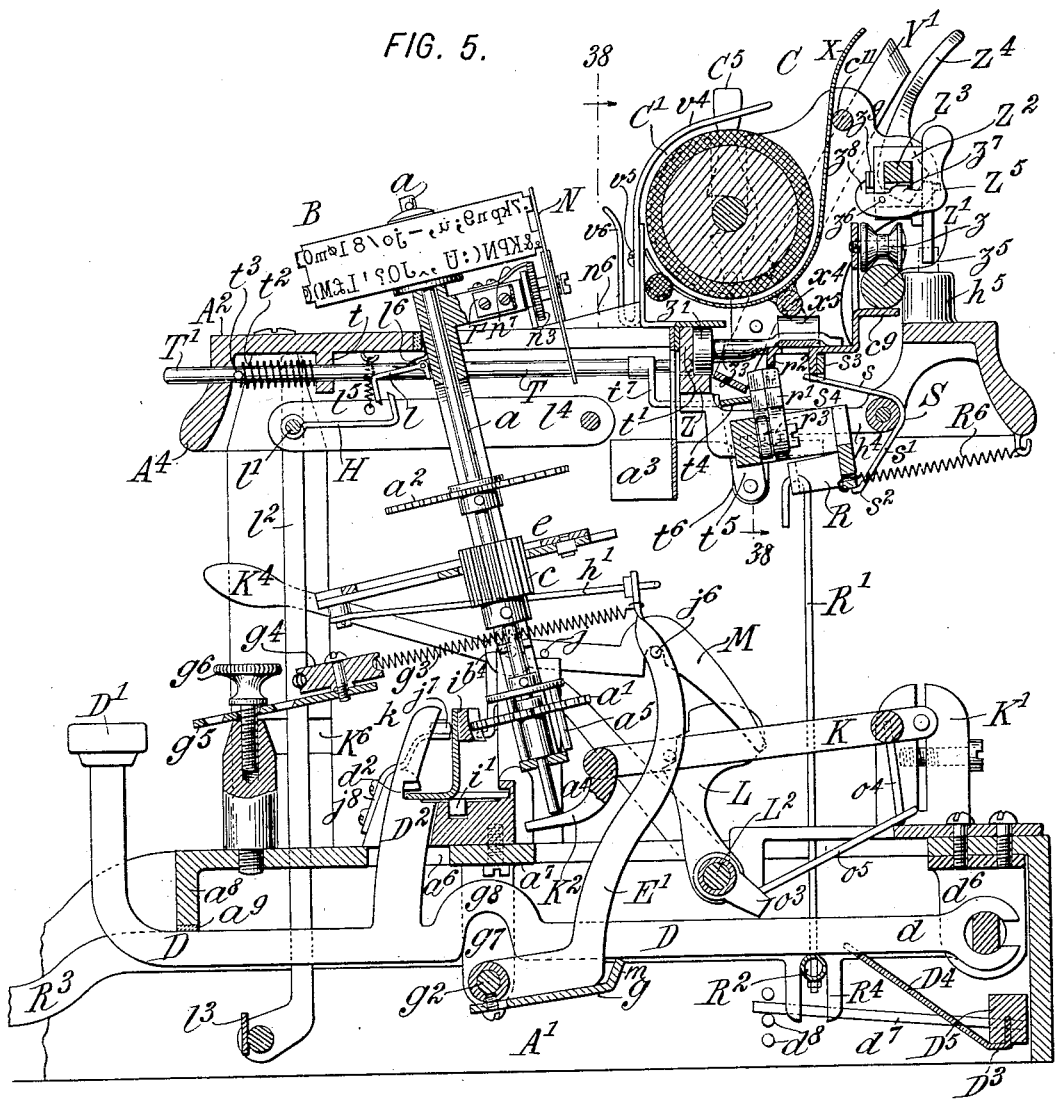

No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 6.

WITNESSES:

INVENTOR:
Richard W. Uhlig,
By Attorneys,

No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 7.

WITNESSES:
René Pruine
Fred White

INVENTOR:
Richard W. Uhlig,
By Attorneys,
Arthur C. Fraser & Co

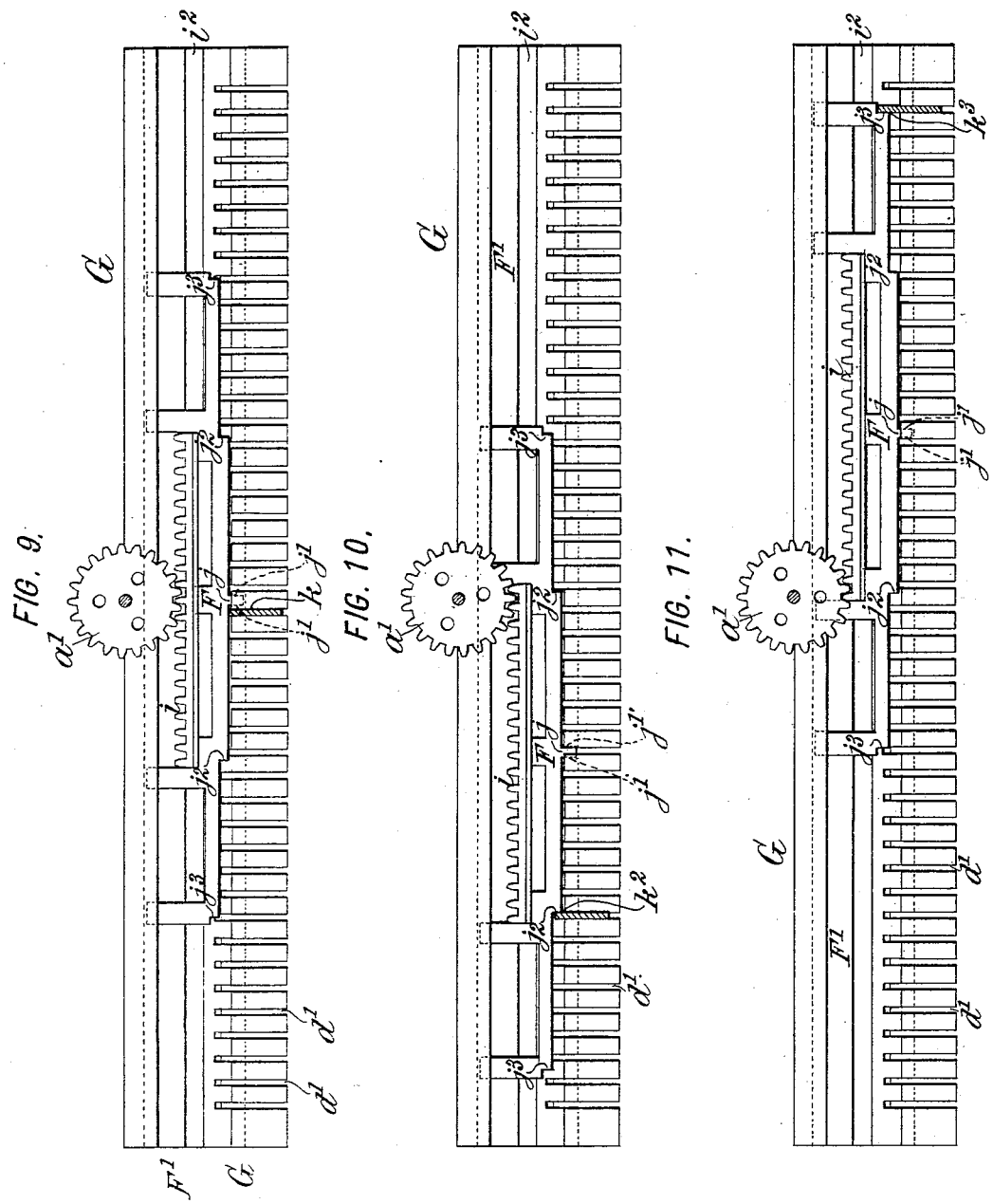

No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 9.
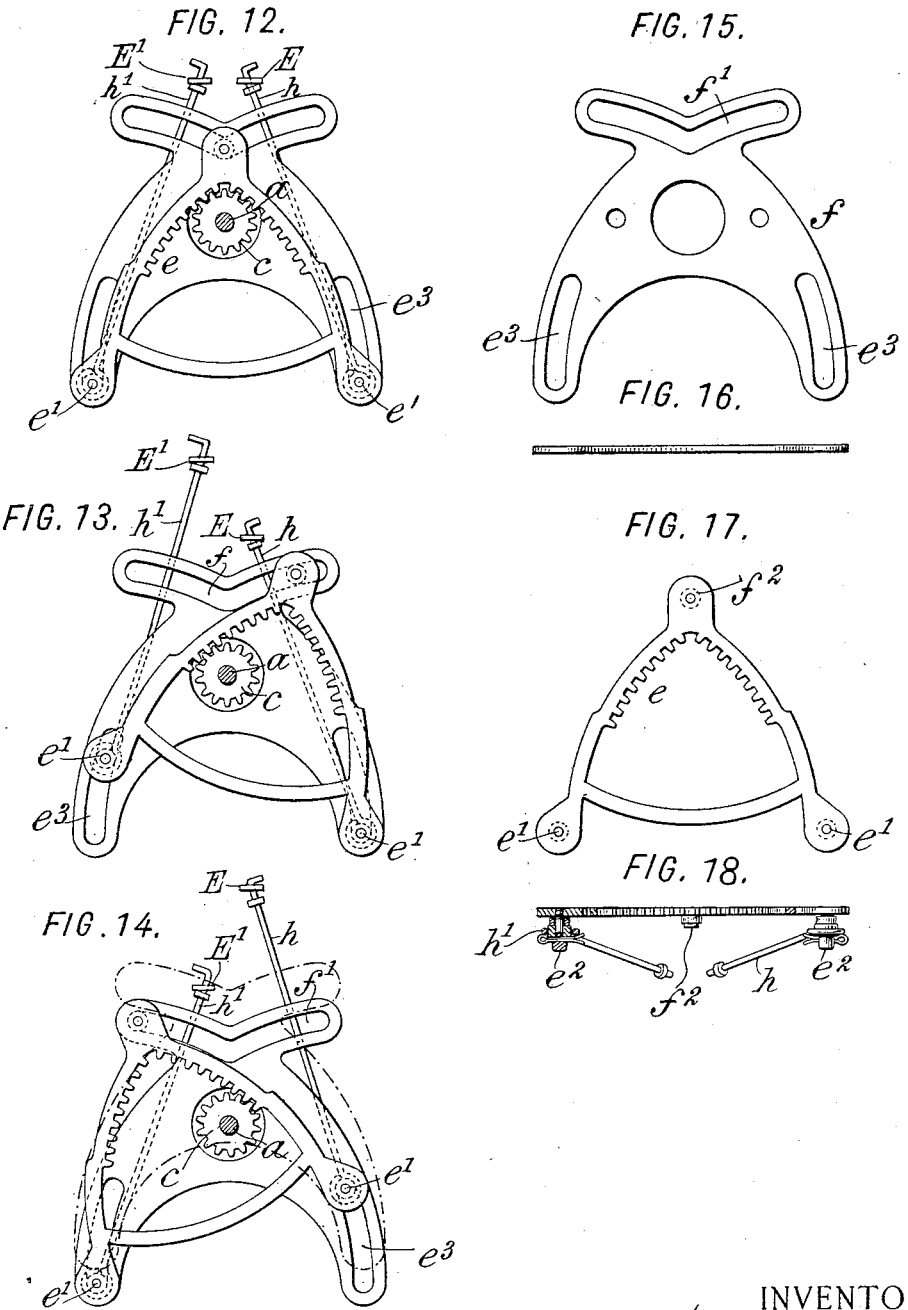
WITNESSES:
René Bruine
Fred White
INVENTOR:
Richard W. Uhlig,
By Attorneys,

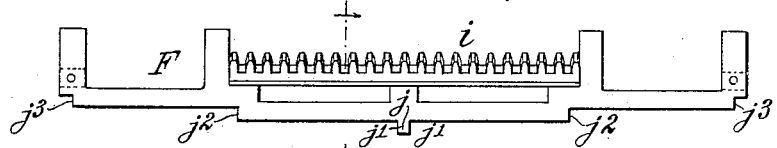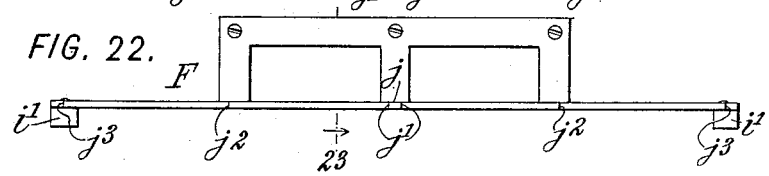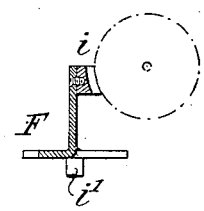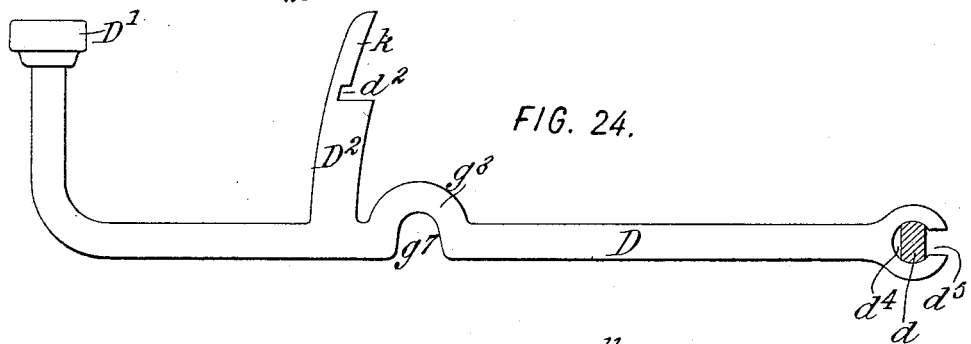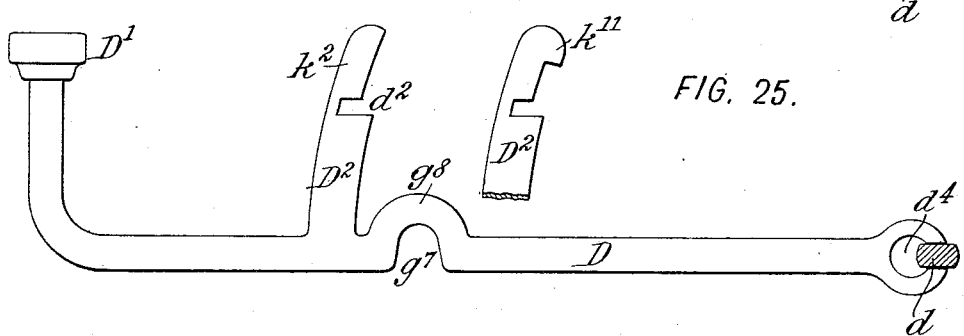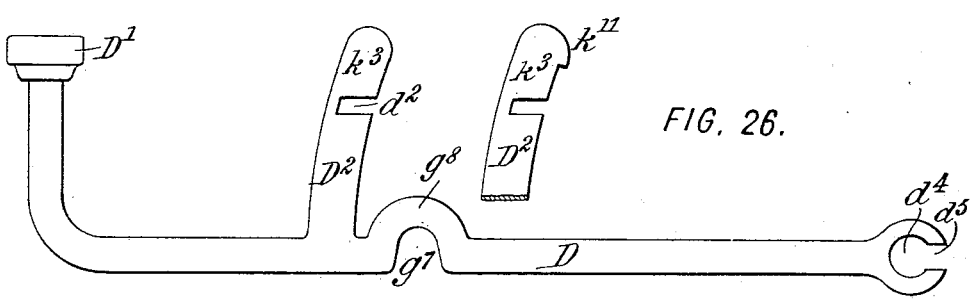

No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 11.

WITNESSES:
René Bruine
Fred White

INVENTOR:
Richard W. Uhlig,
By Attorneys,

No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 12.

WITNESSES:
René Bruine
Fred White

INVENTOR:
Richard W. Uhlig,
By Attorneys,

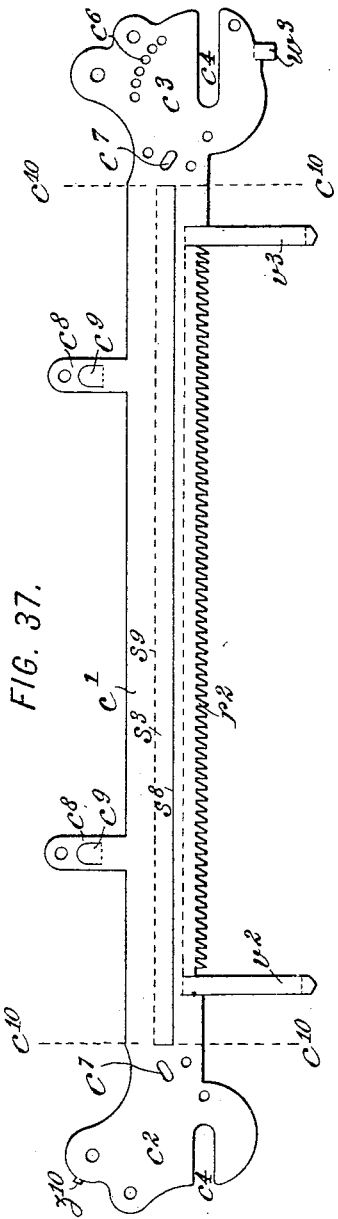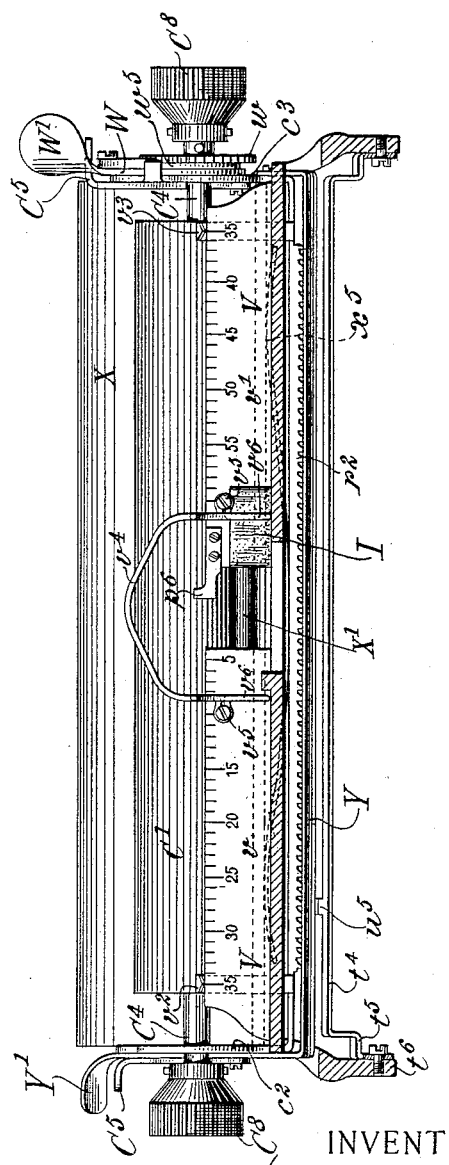

No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 14.

WITNESSES:
Reve Bruine
Fred White

INVENTOR:
Richard W. Uhlig,
By Attorneys,

No. 735,179. PATENTED AUG. 4, 1903.
R. W. UHLIG.
TYPE WRITING MACHINE.
APPLICATION FILED MAR. 29, 1900.
NO MODEL. 15 SHEETS—SHEET 15.

WITNESSES:
René Bruine
Fred White

INVENTOR:
Richard W. Uhlig;
By Attorneys,
Arthur C. Fraser & Co.

No. 735,179.

Patented August 4, 1903.

UNITED STATES PATENT OFFICE.

RICHARD W. UHLIG, OF RUTHERFORD, NEW JERSEY, ASSIGNOR TO HENRY C. ADAMS, OF HACKENSACK, NEW JERSEY.

TYPE-WRITING MACHINE.

SPECIFICATION forming part of Letters Patent No. 735,179, dated August 4, 1903.

Application filed March 29, 1900. Serial No. 10,614. (No model.)

*To all whom it may concern:*

Be it known that I, RICHARD W. UHLIG, a citizen of the United States, residing at Rutherford, in the county of Bergen and State of New Jersey, have invented certain new and useful Improvements in Type-Writing Machines, of which the following is a specification.

This invention relates to improvements in type-writing machines, and more particularly to machines of that class wherein the types are formed on or carried by a type wheel or carrier which is moved or rotated to bring one or another of the types to the printing-point.

It relates also to type-writing machines having a keyboard of keys mounted on key-levers for operating the printing mechanism.

It relates also to type-writing machines wherein the paper is carried by a paper-carriage which is fed past the printing-point by a spacing mechanism and provides improvements in the carriage and spacing mechanism, line-lock mechanism, line-spacing mechanism, marginal stop, tabulating-stops, and carriage-release applicable to such paper-carriage.

The main object of my invention is to construct a machine of very few parts which shall be cheap, simple, durable, portable, and practically effective and the assembling of which shall be readily accomplished with little or no adjustment.

As applied to a type-wheel machine my invention in its preferred form provides a series of novel and simple mechanical movements for causing the depression of any key to first rotate the type-wheel in the proper direction, then to stop its rotation at the appropriate point to bring the corresponding type on the wheel to the printing position, and then to move the wheel bodily toward the paper-carriage to impress this type against the paper at the printing-point, and upon the release of the key to permit the type-wheel to move away from the paper and to rotate back to its normal position, where it is locked in readiness for the next printing operation.

In order that the writing shall be visible, I carry the paper upon a platen-roller or other support and arrange the printing mechanism to impress the characters against the front of such support. Hence in a type-wheel machine I preferably mount the type-wheel to move bodily toward and from the paper, its retractile movement carrying it back sufficiently far therefrom to leave the character last printed clearly visible. To this end I prefer to mount the type-wheel on a type-wheel shaft which is carried in a swinging frame, so that it may revolve therein to select the proper type, and by the swinging movement of the frame the type-wheel may be carried forward bodily against the paper to make the impression. For turning the type-wheel I provide its shaft with a pinion, which is engaged by a rack, which receives movement from any one of the key-levers, preferably through a suitable universal lever. I prefer to divide the key-levers into two series, those of one series acting through the rack to turn the type-wheel in one direction and those of the other series in the contrary direction in order that the extreme movement of the type-wheel need not exceed a half-revolution in one direction or the other. Hence I prefer to use two universal levers, one for each series. Preferably each universal lever through which the key-levers act is differential, so that each key-lever of either series shall displace it to a different extent from every other, and consequently shall transmit through the universal lever a different degree of movement to the rack in order to turn the type-wheel to a different extent, according to the arrangement upon it of the respective types or characters. In order to insure the stopping of the wheel with precision at the exact point in its rotation, which shall bring the proper character to the printing position, I provide a stop mechanism of novel and simple construction. On the type-wheel shaft is mounted a wheel which engages with a slide which moves transversely of the key-levers and which I will call a "shuttle." Preferably the wheel is a gear and meshes with a rack on the shuttle. This shuttle moves in a suitable way or shuttle-race and is formed with stop faces or shoulders adapted to abut against stops which are formed on or connected to the key-levers to such effect that when any key-lever is depressed its connected stop is thereby moved into the path of the corresponding stop face or shoulder on the shuttle, so that when the movement of the key-lever has been communicated through the universal lever and rack and pinion to the type-wheel shaft and the latter through the gear and rack has moved the shuttle the latter coincidently with the required movement of the typewheel will abut against the said stop and be thereby arrested in such position as to present the printing type or character on the type-wheel corresponding to the depressed key in precisely the printing position, so that upon the throwing forward of the type-wheel this type will be impressed upon the paper. The stop mechanism thus provided remains in engagement during the forward or printing movement of the type-wheel, the construction being such that the type-wheel shaft and shuttle remain in mesh during the forward tilting movement of the swinging frame. By preference the key-levers are arranged parallel and are equidistantly spaced as in ordinary type-lever machines, since this arrangement permits of the greatest simplicity and the most extensive duplication of parts. To avoid giving the shuttle a movement beyond the width of the series of key-levers, I provide a vernier arrangement of stops by dividing the key-levers into groups, each group having its stops in a different plane and forming the shuttle with an equal number of stop faces or shoulders arranged to move in the planes of the respective groups of stops on the key-levers. Thus the extreme movement of the shuttle instead of equaling the width of the entire bank or series of key-levers becomes equal to a fraction thereof, of which the denominator equals the number of such groups. For example, if each series of key-levers is divided into three equal groups each carrying one-third of the stops the extreme movement of the shuttle will be limited to one-third the total width of the system of key-levers. My invention thus produces a very compact machine of very simple, cheap, and durable construction, wherein the highest speed possible in a machine of the type-wheel class is attained and wherein is realized the great advantage that the keys have an almost precisely equal resistance and move downward to a practically like extent—that is, have an equal stroke or dip.

My invention also provides numerous improvements applicable in part to type-writing machines having a type-wheel, in part to those having separate key-levers, in part to those having a moving paper-carriage, and also certain features and details applicable to type-writing machines generally, all of which will be fully hereinafter set forth.

Although my invention may be applied in various forms or embodiments, yet to enable those skilled in the art to understand and apply it in the best way known to me I have illustrated in the accompanying drawings a type-writing machine embodying all the features of my invention in what I believe to be its preferred form.

Figure 7:
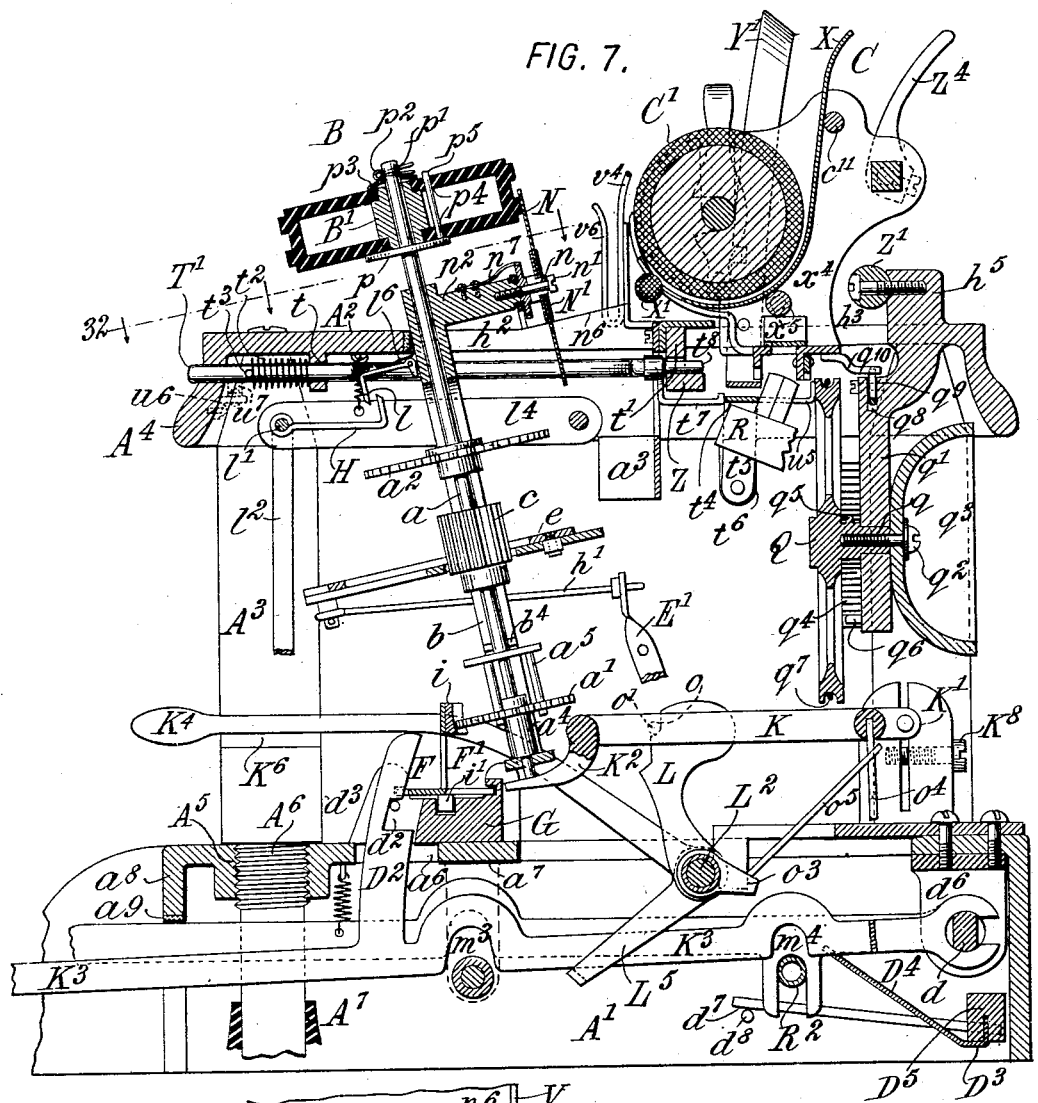
Figures 31, 32:
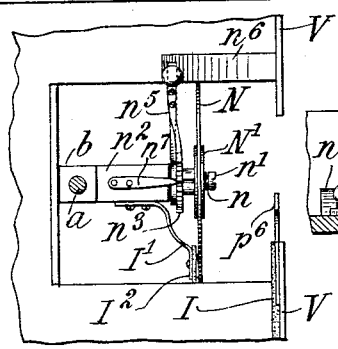
Figure 27:
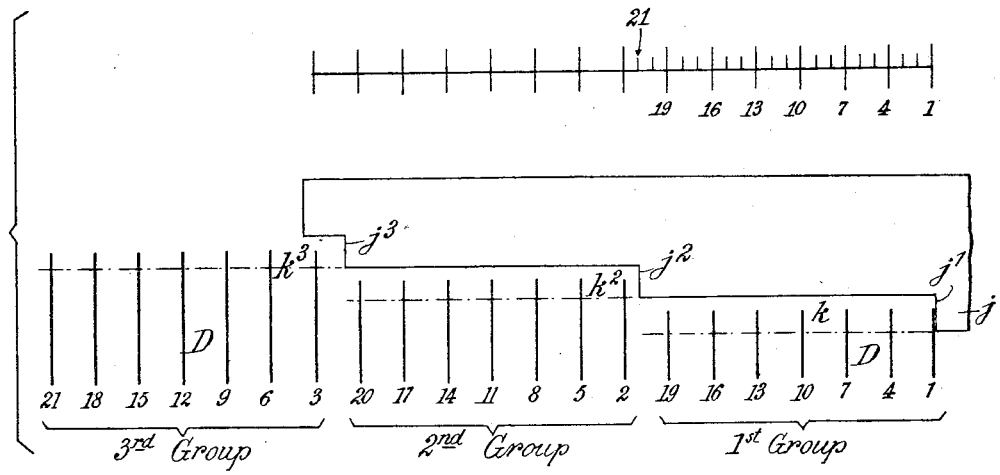
Figure 28:
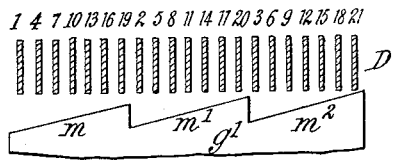
Figure 29:
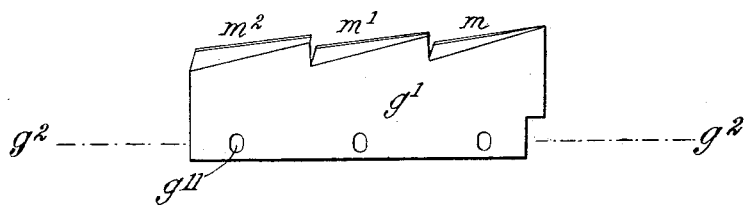
Figure 30:
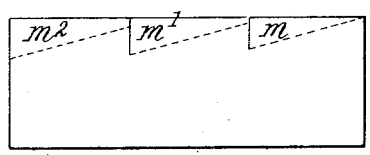
Figure 33:
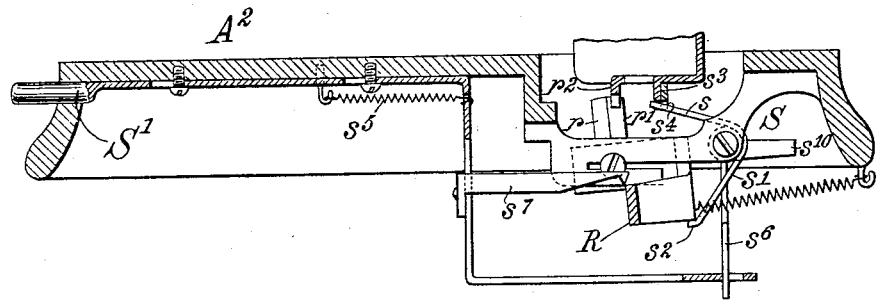
Figure 34:
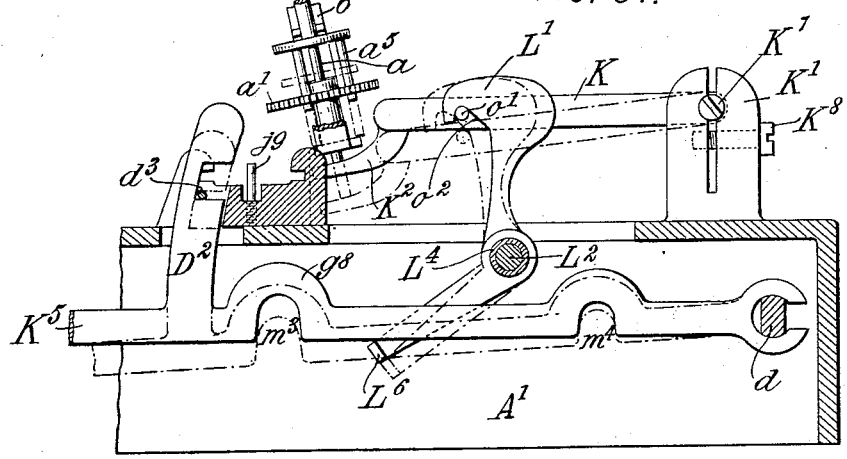
Figures 35, 36:
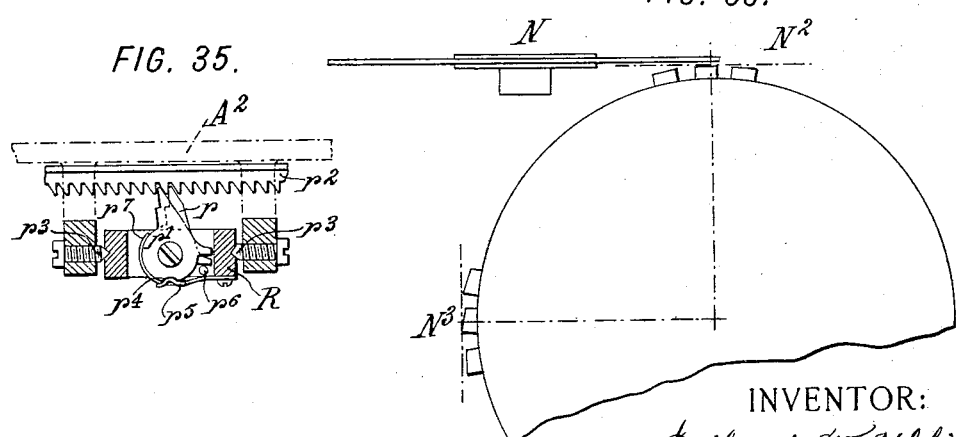
Figure 39:
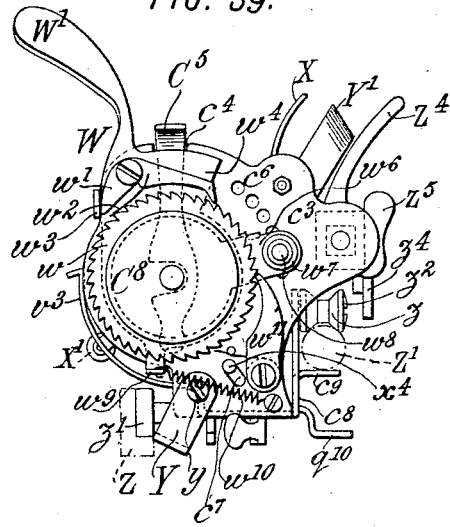
Figure 40:
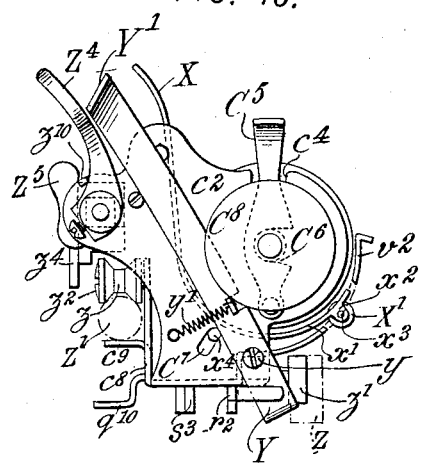
Figure 41:
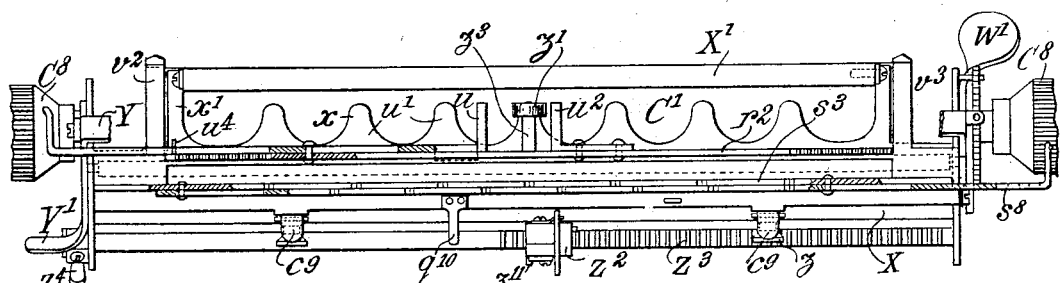
Figure 42:
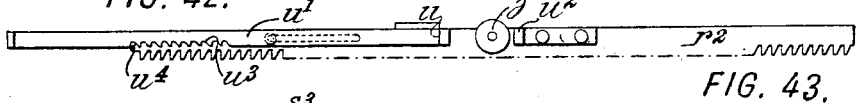
Figure 43:
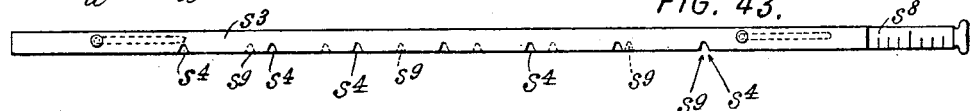
Figure 47:
Figure 48:
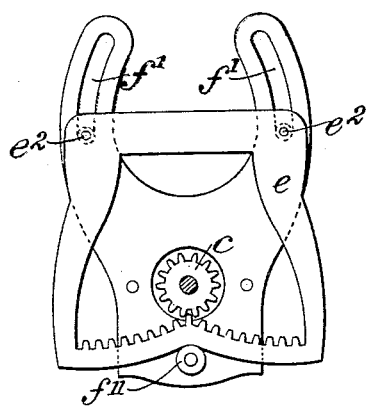
Figure 50:
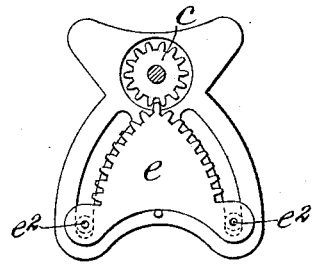
Figure 49:
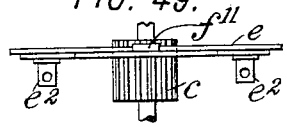
Figure 51:
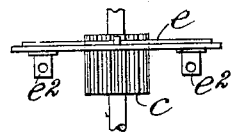
Figure 52:
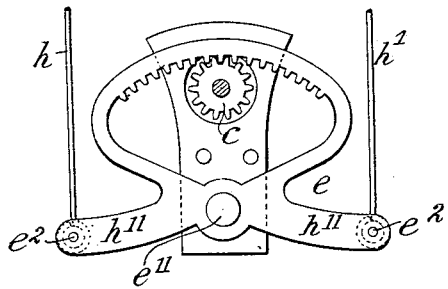
Figure 53:
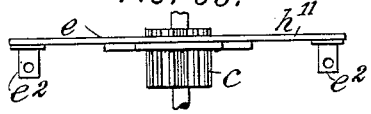

In the drawings, Figure 1 is a side or end elevation of the machine. Fig. 2 is a plan thereof. Fig. 3 is a horizontal section cut on the line 3 3 in Fig. 1. Fig. 4 is an under side plan, partly broken away. The remaining figures are on a larger scale. Fig. 5 is a vertical mid-section showing the parts in the normal position. Fig. 6 is a similar mid-section showing the parts in the act of printing. Fig. 7 is a vertical transverse section in different planes, showing especially the action of the shift mechanism and certain details of construction. Fig. 8 is a front elevation of the type-wheel and its shaft and swinging frame and their accessories. Figs. 9, 10, and 11 are plans of the shuttle-stop mechanism segregated from the remainder of the machine, Fig. 9 showing the shuttle in the normal or central position, Fig. 10 showing it displaced toward the left, and Fig. 11 showing it displaced to the extreme extent toward the right. Figs. 12, 13, and 14 are plans of the rack-and-pinion mechanism for imparting rotation to the type-wheel shaft segregated from the remainder of the machine, Fig. 12 showing the normal position, (answering to Fig. 9,) Fig. 13 showing a partial movement in one direction, (answering to Fig. 10,) and Fig. 14 showing a complete movement in the opposite direction, (answering to Fig. 11.) Figs. 15 and 16 are a plan and edge view of the cam-plate; and Figs. 17 and 18 a plan and edge view, the latter partly in section, of the segmental rack shown in Figs. 12 to 14. Fig. 19 is a side elevation viewed from the same side as Fig. 1, and Fig. 20 is a plan showing the shuttle-rack and its locking and guiding mechanism for locking the type-wheel in its normal position. Fig. 21 is a plan of the shuttle and its rack, Fig. 22 being a front elevation thereof and Fig. 23 a transverse section thereof on the line 23 23. Figs. 24, 25, and 26 are elevations of key-levers of the three different stop groups. Fig. 27 is a diagram illustrating the operation of the shuttle and its stopping mechanism. Fig. 28 is a diagrammatic view illustrating the operation of the differential lever. Fig. 29 is a plan of the differential plate forming part of the differential lever. Fig. 30 is a view of a blank from which such plate may be formed. Fig. 31 is a fragmentary front elevation showing the disk-shaped ribbon and ribbon-feed. Fig. 32 is a fragmentary horizontal section showing in plan the ribbon and its feed. Fig. 33 is a vertical section showing the line-locking device. Fig. 34 is a vertical section showing the reshifting mechanism. Fig. 35 is a vertical longitudinal section of the feed-dog lever, showing the construction of the dogs. Fig. 36 is a diagram of the type-wheel. Fig. 37 is a plan of the metal plate or blank from which the carriage may be bent. Fig. 38 is a fragmentary longitudinal section, looking from the front, cut on the line 38 38 in Fig. 5. Fig. 39 is a right-hand elevation, and Fig. 40 is a left-hand elevation, of the carriage removed. Fig. 41 is an under side view of the carriage. Fig. 42 is a detail of the tabular-stop mechanism. Fig. 43 is a detail of the line-locking mechanism. Fig. 44 is a vertical section of the key-button. Fig. 45 is a similar section cut on the line 45 45 of Fig. 44, and Fig. 46 is a horizontal section cut on the line 46 46 of Fig. 44. Fig. 47 is a plan of the tabular-stop lock detached. Fig. 48 is a plan, and Fig. 49 is an edge view, of a modified form of rack. Fig. 50 is a plan, and Fig. 51 is an edge view, of another modified form of rack. Fig. 52 is a plan, and Fig. 53 is an edge view, of a third modification.

I will now proceed to describe the preferred embodiment of my invention with reference to the accompanying drawings.

The main frame A of the machine is in general of usual form, consisting of a bottom frame or base A' and a top plate $A^2$, mounted thereon by means of uprights or standards $A^3$. Certain novel features of this frame will be hereinafter described.

Let B designate the type-wheel, which in this construction is shown as carrying two rows or circular series of types. It is shown as mounted on a type-wheel shaft $a$, which is carried in a swinging frame $b$, shown as pivoted between screws $b'$ $b'$, Fig. 8. The tilting movement of this frame is sufficient to carry the type-wheel and shaft from its normal position (shown in Fig. 5) to its printing position. (Shown in Fig. 6.)

Let C designate the paper-carriage, which is mounted to travel in suitable ways across the top plate $A^2$. It preferably carries, as usual, a platen or paper-roller C', around which the paper is carried and by which it is supported during the impression.

D D are the key-levers, which carry on their front ends the keys or buttons D' D', arranged, preferably, after the usual manner of the standard keyboard, the levers extending thence back within the base A' and being shown as pivoted on a fulcrum-rod $d$ at the back. The levers are preferably arranged parallel and equidistant, as shown in Fig. 4.

*Type-selecting mechanism.*—The means for selecting the proper type and bringing it to the correct printing position includes two mechanisms, the first of which turns the type-wheel to a greater or less extent, according to the key that is depressed, and the second of which serves to stop the type-wheel at the exact point when the correct character reaches the printing position. The type-wheel when at rest occupies a certain invariable normal position, from which it may turn in either direction through an extreme movement of a half-revolution. Inasmuch as the types are equally spaced upon the type-wheel, so that half of them occupy one semicircumference and half the other, the key-levers are conveniently divided into two series, those of one series serving to turn the type-wheel toward the right and those of the other series serving to turn the type-wheel toward the left. For example, using eighty-four characters arranged in two rows, forty-two in each row, I may employ forty-two keys and key-levers and may divide these into two equal series, the twenty-one keys to the right constituting the one and the twenty-one keys to the left constituting the other of these series. If any key of the right-hand series is pressed, it will, for example, turn the type-wheel toward the left, and vice versa. The extent to which each key must turn the type-wheel depends upon the position on the wheel of the type corresponding to that key. Hence each key of each series should when pressed impart to the type-wheel an angular movement of different extent. For imparting these variable movements to the type-wheel I provide the following-described mechanism: On the type-wheel shaft $a$ is fixed a pinion $c$, as best shown in Figs. 5, 8, and 12, with which meshes a rack $e$, which is capable of a double movement. Its preferred construction is that shown in Figs. 12 to 18, where its rack-teeth are arranged in two arc-shaped segments concentric with two centers $e'$ $e'$, Fig. 17. From these centers project studs $e^2$ $e^2$, Fig. 18, which pass through slots $e^3$ in a stationary guide-plate $f$, Fig. 15, which also has a cam-slot $f'$, into which projects a guiding-stud $f^2$ on the rack. Normally the studs $e^2$ are seated at the front ends of the slots $e^3$, as shown in Fig. 12. In this position each slot $e^3$ is an arc of a circle from the opposite center $e'$. Hence if either stud $e^2$ is held in this same position in its slot, so as to afford a temporary fixed center, the entire rack $e$ may be swung around this center, the other stud moving through the opposite groove $e^3$, while the guiding-stud $f^2$ moves through its guiding-slot $f'$, which also is formed in arcs from these fixed centers. A partial movement to one side is shown in Fig. 13, and a complete movement to the opposite side is shown in Fig. 14. The movement to one side is occasioned by any of the key-levers of one series, while that to the other side is given by any of the key-levers of the other series. For imparting these respective movements to the rack $e$ it is necessary to provide each series of key-levers with a moving part which shall be moved by the depression of any lever, and the movement of which shall be communicated to the rack $e$ to turn it in the proper direction. Any suitable moving part or parts may serve as this intermediary; but for simplicity a single part is preferred, which accordingly is universal, preferably, to the entire series of key-levers. It also must be capable of differential movement, so as to execute varying degrees of movement when acted upon by the several levers of the series. I prefer to provide two such moving parts, one for each series of key-levers, (although this duplication is not strictly necessary or essential,) and for convenience I prefer to form these moving parts as levers. Hence I provide, preferably, two universal and differential levers, the one acted upon by the right-hand series of keys to turn the rack $e$ in one direction and the other acted upon by the left-hand series to turn the rack in the contrary direction. These levers are marked E E', respectively. In the construction shown each of these levers includes a universal and differential plate $g$ or $g'$, which forms, in effect, the lower arm of an elbow-lever. The plates $g$ $g'$ lie beneath the key-levers, as shown in Figs. 4 and 5, so that when any key-lever is pressed down the plate beneath it is displaced, and the lever E or E' is vibrated to a corresponding extent. These levers turn about a fulcrum-rod $g^2$ and are acted upon by springs $g^3$ in such direction as to pull their upper arms toward the front and press their plates against the key-levers. These springs $g^3$ are conveniently constructed as one spring, connected at one end to lever E, extended around a pulley $g^4$ and passed back, and connected at the other end to the lever E'. For adjusting their tension the pulley $g^4$ is mounted on a plate $g^5$, having successive holes, one or another of which may be engaged by a screw $g^6$. Other adjusting means may, however, be substituted. The arrangement of the plates $g$ $g'$ beneath the key-levers is of course incidental to the particular location of their fulcrums on the rod $d$, which is susceptible to change. The two differential levers E E' project up to convenient points for engagement with the rack $e$ and are connected thereto by rods or links $h$ and $h'$, respectively, the former connecting to one stud $e^2$ and the latter to the other. Hence the movement of one lever E will turn the rack in one direction, as shown in Fig. 14, while the movement of the other lever E' will turn it in the contrary direction, as shown in Fig. 13.

The means thus described suffice for turning the type-wheel a distance corresponding approximately to the position of the type to be printed; but these means could not practically be relied upon for accurately selecting the type and bringing it to the exact printing position. Hence I provide a stop mechanism to arrest the wheel when the exact position is reached, and I construct the type-wheel-turning mechanism thus far described so that it tends to turn the type-wheel slightly beyond the precise position desired. I will now describe this stop mechanism.

Instead of mounting the stop device upon the type-wheel shaft or otherwise arranging it to swing around a center, which would necessitate arranging stops to intercept it in the circular path of its movement, I provide an improved and practically simplified means wherein the stop device is caused to move in a straight path transversely of the series of key-levers, and the stops are formed on or directly connected to the respective key-levers. On the type-wheel shaft $a$ I mount a toothed wheel $a'$, which for brevity I will call a "gear," and with which meshes a rack $i$, mounted on or forming an integral part of, if preferred, a slide F, which I will call the "shuttle." This shuttle is shown separately in Figs. 21, 22, and 23. It is conveniently formed by bending up a single plate of metal in the manner shown and fastening to it the rack $i$. Preferably guiding-blocks $i'$ or antifriction-rollers are fixed beneath its opposite ends. This shuttle slides freely in a shuttle-race or guideway F', formed preferably in a longitudinal block or casting G, Figs. 9 and 19, which is fastened to the base A' transversely over the key-levers. The bottom of the shuttle-race has a groove $i^2$ to receive the blocks $i'$ and guide the shuttle. This casting G has equidistant notches $d'$ $d'$ cut or sawed into it along its front side, as shown in Fig. 9, which notches serve as guides for upwardly-projecting stop-arms $D^2$ on the key-levers D. In the normal position of the key-levers their arms $D^2$ project up through these slots, and notches $d^2$ in these arms coincide with the front side of the shuttle-race, so that the shuttle may freely move through these coinciding notches; but above these notches $d^2$ the respective stop-arms are formed with stop-faces $k$, so that when any key is pressed down its stop-face will move into the shuttle-race and serve to intercept the shuttle when the latter is moved a distance corresponding to the position of such key-lever. This is shown in Fig. 6, where one key-lever is depressed with its stop intercepting the shuttle.

Referring to Fig. 21, the shuttle has on its front a central projection $j$, the opposite sides of which constitute stop-faces. I have also shown this shuttle as having at each side two shoulders or stop-faces, (marked $j^2$ $j^3$, respectively.) The purpose of employing three stop-shoulders on each side I will explain presently. The key-lever arms $D^2$ have their stop portions $k$ arranged to move into the path of the respective stop-faces on the shuttle. The arrangement is such that when any key is depressed its stop $k$ moves into the path of the corresponding stop face or shoulder on the shuttle at such point as to arrest the shuttle when it is moved a distance such as to bring the type corresponding to the depressed key to the printing position. Hence the stops are so arranged that each will arrest the shuttle at a different point in its movement, and hence present a different type on the type-wheel at the printing position. Assuming, for example, forty-two types in each row on the type-wheel and forty-two keys, the latter being divided into right-hand and left-hand series of twenty-one each, the shuttle has an extreme movement to each side of its normal central position through twenty-one spaces, and being stopped at any intermediate position it presents the corresponding type on the wheel at the printing position. For example, if moved through ten spaces it presents the tenth type at the printing position, or if moved through thirteen spaces it presents the thirteenth type at the printing position. Hence it is necessary to arrange the twenty-one stops $k$ of each series of key-levers so as to arrest the shuttle at twenty-one different positions, differing each from the next by one space. The spaces referred to may be of arbitrary dimensions, but must have some definite relation to the spacing of the key-levers.

If the key-levers viewed in plan are straight and parallel and are spaced apart the distance required by the standard keyboard in general use, then it is obvious that the shuttle might have only one stop-face in each direction—for example, the projection $j$—and by giving the shuttle a movement which would bring this stop-face into contact with the stop of any key-lever of the series the shuttle would then have an extreme movement from its central position equal to half the width of the entire system of key-levers in the machine—that is, equal to the width of one series of key-levers. Such an extreme movement of the shuttle would have two disadvantages. It would carry the shuttle and rack at the extreme movement thereof so far to either side as to require widening the machine beyond the dimensions otherwise necessitated, or would cause the shuttle to project beyond the frame of the machine, and so considerable a movement would preclude very high speed of manipulation and render the machine undesirably noisy in operation. To avoid these disadvantages, I arrange the shuttle to move only a fractional part of the extreme movement thus suggested. It might, for example, move one-half of such extreme distance or one-third or one-fourth. In the drawings I have shown it as moving one-third this supposed extreme movement, and for this purpose I provide it on each side with three stop faces or shoulders $j'$, $j^2$, and $j^3$, and I divide each series of key-levers into three groups preferably equal in number and arrange the stops $k$ of each group to arrest one of the three faces on the shuttle. This involves the adoption of what is essentially a vernier arrangement of stops, an arrangement which can best be explained with reference to the diagram Fig. 27. In this I have shown one-half of the shuttle and one series of key-levers, the latter being indicated by lines D, which indicate the right-hand or stop faces of the levers. In the figure above the shuttle I have shown a scale indicating the successive spaces through which any point on the shuttle—for example, a point opposite the stop-face $j'$—will move, and at any one of which it may stop. These spaces I will refer to as "unit-spaces." These spaces in this arrangement are necessarily one-third the spacing apart of the levers D. The levers are divided into three groups, the first group having its stops $k$ (marked $k'$) adapted to enter the path of movement of the first stop-face $j'$. The second group has its stops $k^2$ adapted to enter the path of the second stop-face $j^2$, and the third group has its stops $k^3$ adapted to enter the path of the third stop-face $j^3$. Of course normally all the stops $k'$ $k^2$ $k^3$ are out of the paths of the shuttle-faces and only brought into the paths thereof by depressing any key-lever. The diagram shows the first stop-face $j'$ in contact with the first stop $k'$ on the first key-lever of the first group. In this position the second stop-face $j^2$ is one space removed from the next stop $k^2$, and the third stop-face $j^3$ is two spaces removed from the nearest stop $k^3$, while the first stop-face $j'$ is of course three spaces removed from the second stop $k'$, and so on throughout the series. Hence to stop the shuttle at the first space, as shown, the first key-lever (marked 1) is depressed to bring its stop $k'$ into the path of the stop-face $j'$, or to arrest the shuttle at the second space the first lever of the second group (marked 2) is depressed. To stop it at the third space, the first lever of the third group (marked 3) is depressed, to stop it at the fourth space, the second lever of the first group (marked 4) is depressed, and so on throughout the entire series. Thus the first group contains the levers marked 1 4 7 10, &c., for stopping the shuttle at the first, fourth, seventh, tenth, &c., spaces. The second group in like manner has the keys marked 2 5 8, &c., for stopping the shuttle at the second, fifth, eighth, &c., spaces, and the third group has the levers 3 6 9, &c., for stopping the shuttle at the third, sixth, ninth, &c., spaces. According to this system the successive key-levers D and their stops $k$, &c., are separated an extent equal to three unit-spaces.

In the printing operation the depression of any key-lever therefore performs two functions. First, it causes the rotation of the type-wheel in the proper direction to an extent approximating and tending to exceed that necessary to bring the appropriate type to the printing position, and, second, it interposes a stop to arrest the shuttle when it has traversed the number of unit-spaces necessary to bring the required type precisely to the printing position. Any rebound of the type-wheel upon the shuttle striking its stop is prevented by the type-wheel-turning mechanism, which so long as the key is depressed exerts a constant tendency to urge the wheel to continue to revolve forward, and consequently holds the shuttle pressed against its stop and resists any rebound. It then only remains to print the type thus selected. This of course might be done by keeping the type-wheel immovable and moving the paper-carrying platen against it or otherwise by causing a hammer behind the paper to act as a platen to force the paper against the type, these methods being common in existing machines; but instead thereof I prefer to bring the type-wheel against the platen by the means which I will now describe.

*Printing means.*—In order that the typewheel may be moved forward against the paper, its shaft $a$ is mounted, as already described, in the swinging frame $b$. This frame is normally held back in the position shown in Figs. 1 and 5 by the tension of suitably-arranged springs. The springs $g^3$, acting through the levers E E' and rods $h\ h'$, tend to thus hold it, and in addition I may provide a spring $b^2$, (shown in Fig. 1,) connected at one end to a suitable point on the swinging frame $b$, while its other end is hooked over one or another of several hooks on a plate $b^3$, Fig. 1, whereby to vary its tension.

In order to swing the frame $b$ forward to cause the selected type to print, I give the levers E and E' a total movement beyond that which would suffice to rotate the type-wheel sufficiently to bring its proper type to the printing position. Thus the movement of the lever E or E' first acts, through the rack $e$, to rotate the type-wheel until this rotation is stopped by the arrest of the shuttle. Thereupon the forward pull exerted by the lever E or E' continues, and as the wheel can revolve no farther the pull can only displace the frame $b$ bodily, which it does by tilting or swinging it forward to the position shown in Fig. 6, causing the type-wheel to strike against the platen and print the selected type. On releasing the key the springs force back the frame $b$ and also rotate the type-wheel backwardly to its initial position, in which position it is held by the tension of the springs $g^3$, communicated through the rods $h\ h'$, to hold the studs $e^2$ pressed into the front ends of the slots $e^3$, thereby holding the rack $e$ in the position shown in Fig. 12.

To prevent any blurring of the impression and to prevent premature turning of the type-wheel backward upon release of the key, I prefer to apply to the type-wheel shaft an ordinary star-wheel $a^2$, coöperating with a fixed plate $a^3$, mounted on the frame, which as the type-wheel approaches the paper is received into one of the notches in the star-wheel in the well-known manner.

The forward movement of the type-wheel must be unaccompanied by any disengagement thereof from its shuttle, and to accomplish this I so construct the gear $a'$ and rack $i$ that they must remain in mesh notwithstanding the tilting movement which is imparted to the gear by the swinging of the frame $b$. To this end I prefer to mount the gear $a'$ in the plane of the pivotal axis around which the frame $b$ swings—namely, an axis passing through the centers of the pivot-screws $b'$—and I make the rack $i$ of considerable width, the working faces of its teeth being formed as arcs of circles struck from the same axis as a center in the manner clearly indicated in Figs. 5 and 23. In the latter figure I have shown in dotted lines a complete circle, of which the inner face of the tooth forms an arc. Other relative conformations of the gear and rack might be substituted for keeping them in mesh notwithstanding the swinging movement.

Inasmuch as the thrust which rotates the type-wheel is in the same direction as that which tilts it against the platen, some means is desirable for operating at high speed to insure that the wheel shall not move forward far enough to make the impression until it has turned far enough to bring the required type to the printing position. To insure this, I provide a detent which acts to prevent the movement of the swinging frame to the printing-point until the completion of the turning movement of the type-wheel, this detent being withdrawn toward the latter portion of the downward movement of the key-lever. In the construction shown, Figs. 5 and 6, this detent comprises a hook H, adapted to engage the swinging frame $b$ or a part carried thereby, as the catch $l$, when the frame is in its retracted position and adapted to be moved by any key-lever to release the frame when the type-wheel B has been rotated to bring its corresponding type to the printing position. To effect this, I fix the hook H to a bar $l'$, which extends transversely of the key-levers at the front of the frame, and I give this bar the necessary movement by connecting it through links $l^2$ with a suitable universal bar or plate $l^3$, which extends transversely below the key-levers near their forward ends. The universal plate $l^3$ is arranged at such a distance below the key-levers that it is not engaged by them until the latter part of their strokes, and the detent H hence remains in position to engage with the catch $l$ until the key-lever has acted through the rack $e$ to bring its type to the printing position. To properly guide the detent H in its vertical movement, I provide suitable levers $l^4$, which are shown as fulcrumed at their rear ends to the top plate $A^2$ and at their front ends as pivotally connected to the bar $l'$. A suitable spring $l^5$ acts to hold the detent H in its uppermost position, so that upon release of a key-lever and before the frame $b$ is retracted the detent is moved by the spring into position to again engage the catch $l$ when the frame $b$ approaches its rearward position. The catch $l$ is shown as pivoted to the frame $b$ upon a horizontal axis, so that upon the rearward movement of the frame it may ride over the detent H and drop behind the latter to again engage therewith. In this latter movement it is actuated by gravity, which may be assisted by a small spring $l^6$. Fig. 5 shows the type-wheel in its normal or rearward position with the parts in engagement, and Fig. 6 shows the detent retracted by the movement of a key-lever and the type-wheel at the printing-point.

When a key-lever is depressed, the lever E or E' acts upon the frame $b$ and rack $e$ to simultaneously rotate the type-wheel and swing the frame. This effect is an advantageous one, in that the wheel may rotate while the frame is swinging, thus reducing the time necessary for each complete movement to print a character. The detent H and catch $l$ are therefore so formed relatively to each other that the frame is allowed to swing forward to a certain degree before it is stopped, this stopping action being merely to insure that the proper type has been brought into printing position before the star-wheel $a^2$ can engage its projection $a^3$, after which engagement no further rotation of the type-wheel is possible.

*Type-wheel lock.*—Upon completion of the printing operation the swinging frame in moving back under the tension of its spring toward its retracted position causes the shaft $a$ to rapidly rotate to return the type-wheel B to its normal position, and it is desirable that upon reaching this position the rotation of the type-wheel should be stopped, so that it shall not be carried by its momentum past such position and so that it cannot rebound. To effect this result in the present construction, I provide a stopping mechanism for limiting the movements of the shuttle, which acts to lock the wheel in its normal position and which is adapted to be moved to disengage the shuttle by the key-levers, preferably through the medium of the differential levers E E', during the initial movement of the latter. This stopping mechanism preferably comprises two members for engaging the shuttle to prevent its movement in either direction, the one adapted to be moved by the lever E and the other by the lever E' for disengaging the shuttle to permit its movement in appropriate direction and each held out of engagement until the wheel has swung to the printing-point and has been retracted to its normal position. I have shown the mechanism I prefer to employ for this purpose in Figs. 5 and 6 and in detail in Figs. 19 and 20. As shown, it comprises two levers M, which are fulcrumed to suitable lugs $j^4$, to which the swinging frame $b$ is pivoted. Each of the levers M is formed with a stop-arm M', the lower end of which is adapted to engage one end of the rack $i$. Before the type-wheel can be rotated to bring a type to the printing position one of the locks M' must be disengaged from the rack $i$, so that the shuttle may move along its race. In order to effect this unlocking operation, any suitable connection may be made with the key-levers; but I prefer that the necessary movement be imparted to the levers M by the differential levers E E'. To effect this, I form the rear arm of each of the levers M with a notch $j^5$, Fig. 19, the rear wall of which constitutes a cam-face, which is adapted to be engaged by a pin $j^6$, fixed to the lever E, (or E',) so that upon movement of the latter its first effect is to act upon the cam-face $j^5$ to raise the corresponding lever M, as seen in dotted lines in Fig. 19. It is necessary that the levers E E' should thus act upon the levers M before they effect any movement of the rack $e$. This is done in the present construction by forming a lost-motion connection between the levers E E' and the rods or links $h\ h'$, as clearly shown in Figs. 12 to 14. It is also necessary that after unlocking the shuttle the lever M shall be held in its upper or retracted position during the entire rotation of the type-wheel, its movement to the printing-point, and its retractile movement. This is accomplished in the present construction by so forming the levers M that the pins $j^6$ may ride along their under sides and prevent their downward movements until the lever E or E' has restored the rack $e$ to its normal position in readiness for the next printing operation. This is best done by forming the under side of the levers M in the arcs of circles of which when said levers are in their displaced positions the fulcrum-axis $g^2$ of the levers E E' is the center. (See Fig. 6.) It will be understood that but one of the stop-arms M' is displaced during each printing operation, the lever E', which moves the shuttle to the right, actuating the right-hand lever M to permit such movement and the lever E acting with the same effect upon the left-hand lever M. Thus upon return of the shuttle after any printing operation one of the stop-arms M' is normally in the path of movement of the shuttle and acts to prevent movement of the latter beyond its central position, and when this position is reached the second arm M' immediately falls behind the shuttle, thus preventing any rebound of the latter and locking it against movement in either direction.

I preferably provide a small antifriction-roller $j^7$, which bears against the front of the rack $i$, as shown in Figs. 3, 5, and 6, and holds the latter in engagement with the gear $a'$, so that the shuttle may be moved by the gear along its race without undue friction. The roller $j^7$ is shown as mounted upon a suitable support $j^8$, fixed to the front side of the casting G.

Suitable stop-pins $j^9$ may be provided at the ends of the shuttle-race, as shown in Fig. 3, for preventing accidental displacement of the shuttle from its race during repairing or cleaning, although this will ordinarily be unnecessary.

*Differential levers.*—I will now describe more in detail the preferred construction of the differential levers E and E'. As these are alike, except that they are relatively reversed (or turned right for left,) it will be sufficient to explain only one.

The differential movement to a different degree for each key-arm of the series may be accomplished in two ways—first, by so forming the plate that it is engaged by the key-levers at different points in their strokes, whereby the lever which is to rotate the type-wheel the least has a relatively large degree of lost motion before engagement with the plate $g'$, and the lever which is to rotate the wheel the most has a relatively small or no lost motion before engagement with the plate;

second, the plate may be so formed that the levers engage it at points nearer to or farther from their fulcrum-axes, and in the construction shown farther from or nearer to the fulcrum-axis of the lever E'. By this latter means the degree of movement of the lever D is of course greater as the point of engagement recedes from the fulcrum-axis of the levers, and the movement of the lever E' is greater as the point of engagement approaches its fulcrum-axis $g^2$. I prefer to take advantage of both these means in my present construction in such manner that the one will augment the other and a compact and simple construction may be obtained.

In Fig. 28 I have illustrated diagrammatically the plate $g'$ and have shown in section the series of key-levers D, which coöperate with this plate. The plate $g'$ might be made with a gradual incline from one end to the other and arranged to be engaged by the key-levers at substantially the same distances from their fulcrum-axis, the inclined portion thereof constituting, essentially, a number of engaging points of successively different degrees of projection, so that the plate would be moved to a different extent by each of the key-levers because of the varying amount of lost motion between the respective levers and the plate. In this case, however, it is obvious that the lever at the extreme right hand would effect the greatest movement of the type-wheel and the lever at the extreme left hand would effect the smallest movement thereof and that the intermediate levers would act upon the wheel with a constantly-decreasing effect; but with the particular construction of stopping mechanism hereinbefore described with reference to Fig. 27, wherein the key-levers of each series are divided into three groups, (for example,) it is necessary to correspondingly modify the relation of the levers with the differential plate. Hence I form the plate $g'$ with three stop-faces $m$ $m'$ $m^2$, Figs. 28 and 29, each of which in the construction shown is adapted to be engaged by a group of type-levers, each of which groups comprises seven levers. These groups are identical with those before referred to with reference to the shuttle mechanism. The three stop-faces $m$ $m'$ $m^2$ are preferably of the same length and shape, but extend at different distances from the fulcrum-axis $g^2$, the face $m^2$ being nearest to the fulcrum-axis $g^2$ and the face $m$ being farthest removed therefrom, as shown in Figs. 4 and 29. Referring to Fig. 28, it will be seen that the lever 1 (which is the lever 1 of the diagram Fig. 27) is adapted to engage the plate $g'$ at the lowest part of the face $m$—that is to say, the lever 1 has the greatest amount of lost motion of the entire series of key-levers. The depression of this lever hence effects the least movement of the plate $g'$ and hence of the rack $e$ and type-wheel B. This slight movement is further lessened by the fact that the portion of the face $m$ thus engaged by the lever 1 extends a greater distance from its axis $g^2$ toward the fulcrum of the key-levers than any other portion of this face $m$ or of the faces $m'$ and $m^2$. This brings the point of engagement of the lever with the plate nearer to the fulcrum of the lever and farther from the fulcrum of the plate, as before explained. In the diagram Fig. 27 it will be noted that the stop of the lever 1 acts to arrest the shuttle, and hence the type-wheel, after the latter has moved from its normal position to bring the first type to the printing position. The lever 2 (the stop-face of which is shown at 2 in the diagram Fig. 27) acts upon the face $m'$ at the point of its greatest horizontal extension and least vertical projection and acts to move the plate $g'$ to an extent sufficiently exceeding that caused by the movement of lever 1 to bring the second type upon the type-wheel B into printing position. Simultaneously the stop 2 is interposed in the path of the shuttle and engages the stop-face $j^2$. The movement of the type-wheel to bring the third type to the printing position is occasioned by the lever 3, (which is the first lever of the third group, the stop-face 3 of which is shown in the diagram,) which acts against the third face $m^2$ at its point of greatest longitudinal extension and least vertical projection. To bring the fourth type upon the wheel B to the printing position, the second lever of the first group is depressed to act upon the face $m$, which by reason of its constantly-decreasing longitudinal extension and increasing vertical projection is engaged by the lever at a point farther from the fulcrum-axis of the latter than the lever 1 and at a point in its stroke nearer to its upper or normal position. The plate $g'$ is hence tilted to a greater extent by the lever 4 than the lever 1.

It will be understood that upon depression of the lever 4 the stop 4 (shown in the diagram) will be moved into the path of the stop-face $j'$ of the shuttle, thus arresting the movement of the type-wheel when the fourth character has been brought to the printing position. The fifth type is brought to position by the lever 5, which is the second lever of the second group, the sixth type by the second lever of the third group, the seventh type by the third lever of the first group, and so on, the depression of each lever moving its stop into the path of the stop-face on the shuttle corresponding to the face $m$, $m'$, or $m^2$ of the plate $g'$, against which the lever acts when depressed.

Although the plates $g$ $g'$ may be formed in any suitable manner, yet I prefer to employ that shown, which consists of a rectangular sheet-metal plate, upon which the faces $m$ $m'$ $m^2$ are formed by cutting the plate transversely and angularly bending each of these faces, so that they project above the body of the plate to an increasing extent. The blank plate is shown in Fig. 30, the angle of bending being indicated by dotted lines, and Fig. 29 shows the plate $g'$ completed. The plate $g$ is of the same construction as the plate $g'$, except that its faces $m$ $m'$ $m^2$ are reversely arranged.

It will be understood with reference to Figs. 29 and 30 that the face $m^2$ projects vertically to the greatest extent from the plane of the plate and that such vertical projection is less with the face $m'$ and still less with the face $m$, but that the relative longitudinal extension of the faces is in reverse order—that is to say, the face $m$ extends to the greatest degree from the fulcrum-axis $g^2$. In the diagram Fig. 28 no attempt has been made to show the different degrees of longitudinal extension of the faces, but only their vertical projection.

It is obvious that instead of forming the projecting faces upon the plates $g$ $g'$ the same result could be accomplished by forming these faces upon the key-levers. In this case with the construction of shuttle mechanism shown the same grouping of levers would be adopted.

In the form of differential plates shown the different lengths of the key-levers, due to their arrangement in the keyboard shown, having four banks of keys, has not been taken into consideration, as the different leverages with which they act upon the differential plate does not in practice produce any serious differences in touch. Where extreme uniformity is required, however, this difference in leverage may be compensated for by forming each face $m$, $m'$, and $m^2$ as a series of projections and making these projections of such relative length that each may be engaged by its key-lever at such a point relatively to the fulcrum-axis of the latter that substantially the same leverage may be exerted by each key-lever—that is to say, the distance from the fulcrum to the point of engagement with the projection shall bear the same ratio to the distance from fulcrum to key, for short levers as well as for long ones. The plates $g$ $g'$ are preferably made adjustable transversely of their fulcrum-rod, this being done in the construction shown by forming the plates with slots $g^{11}$, through which pass suitable screws, as shown in Fig. 4, securely holding the plates against movement longitudinally of their fulcrum-rods, but permitting their adjustment transversely thereto.

*Inking mechanism.*—My invention provides an improved inking device, which while especially suited for use in machines having a rotary type-wheel may be also employed with good effect in other type-writing machines. I provide a flexible member interposed between the paper and type at the printing-point, which member is preferably, although not essentially, initially charged with ink. I provide means for inking this flexible member continuously or at stated intervals, preferably upon each movement of a type to the printing-point. The inking of the ribbon may, however, be continuously effected, if desired. My invention further provides a new form of ribbon, which is preferably circular and is adapted to be rotated to present a fresh surface at the printing-point. In the construction shown the ribbon is mounted upon the type-wheel frame and means are provided for rotating the ribbon at each forward movement of the frame to a sufficient extent to interpose a fresh surface between the type-wheel and paper. An inking-pad or other suitable device is preferably fixed to a stationary part of the type-writer frame in the path of movement of a portion of the ribbon, so that at each movement of the type-wheel frame the ribbon is brought into contact with the inking-pad, and is thereby recharged with ink. Suitable means are preferably provided for pressing the ribbon against the ink-pad at each movement of the frame. I prefer to provide means whereby the ribbon may be relieved of any excess or surplus of ink which may be taken up by it, so that it may not become overcharged, and thus blur the impression. In Figs. 7, 31, and 32 is illustrated such a device in its preferred form as applied to a type-writing machine of the class shown. As shown, the ribbon N is of circular form and is interposed between the type-wheel and carriage and moves with the former during the printing movement of the swinging frame, although this is not essential. It is preferable, however, in that after each printing movement the ribbon is retracted with the frame, so that it does not obscure the character last printed and in that it permits the use of simple mechanism for continuously inking the ribbon. As shown, the ribbon N is reinforced at its center by a circular reinforce N' of metal or other suitable material, both the reinforce and the ribbon being formed with a central perforation, which is adapted to spring over a catch $n$, which is shown as a split tube held by a suitable screw or pin $n'$ upon a forwardly-projecting arm $n^2$, formed at the upper end of the swinging frame $b$. The ribbon N is preferably rotated to a sufficient extent at each printing movement of the type-wheel to present a fresh surface to the next character to be printed. I have shown a simple device for accomplishing this result, which comprises a ratchet $n^3$, fixed to the catch $n$ at the rear, a lever-arm $n^4$, pivoted upon the arm $n^2$ of the frame $b$, and a spring-pawl $n^5$, carried by the arm $n^4$ and adapted upon the upward movement of the latter to engage the teeth of the ratchet $n^3$ and rotate the latter and the ribbon N to the desired extent, as best seen in Fig. 31. The movements of the lever-arm $n^4$ may be given by any suitable means, but as shown the top plate $A^2$ of the type-writing machine is formed adjacent to the frame $b$ with a rise or cam $n^6$, along which the end of the lever $n^4$ is moved during the forward movement of the swinging frame $b$. The lever-arm $n^4$ may be weighted, as shown, so as to insure its prompt descent when the swinging frame $b$ is retracted, the ribbon N being prevented from accidental rotation in a backward direction during this movement by a spring-detent $n^7$.

In the construction shown the ribbon is rotated during the forward swinging of the type-wheel frame. It is obvious that the same result may be accomplished by reversing the direction of the cam $n^6$, thus causing the ribbon to rotate during the backward movements of the type-wheel frame. This latter construction will avoid any possibility of rotation of the ribbon during contact of the type-wheel with the paper.

The ribbon is conveniently inked at each movement of the type-wheel frame $b$ and preferably during its forward movement. To effect this, I provide an inking-pad I, which may be fixed to some part of the frame (as shown, the scale-plate V) in the path of movement of the ribbon N during the forward swinging of the frame $b$. During this movement a portion of the ribbon is pressed against the inking-pad by a plate I', fixed to the arm $n^2$ of the frame $b$, as shown in Figs. 31 and 32. This plate I' may be a spring-plate, if desired. It is obvious, however, that the ribbon may be rotated and inked by any suitable mechanism, that shown being adopted by me because of its simplicity and cheapness. The inking-pad or other inking device I may be of any desired capacity and may be charged at such times as is found necessary.

In the construction shown it is possible that the inking-pad I may inadvertently be so overcharged with ink that the capacity of the ribbon will be exceeded and blurring of the printing result. I hence prefer to provide means whereby such a possible excess may be taken up, and in the present construction this is accomplished by mounting a pad $I^2$ upon the plate I' between this plate and the ribbon. This pad should be so proportioned that it is capable of absorbing from the ribbon any undesirable excess of ink. As the ink is consumed in use that absorbed by the pad $I^2$ may be then utilized for inking the ribbon. Obviously the pad $I^2$ might constitute the sole means for charging the ribbon; but I prefer to use this pad in the manner and for the purpose just described.

*Shifting mechanism.*—My invention provides a simple and effective shifting mechanism for bringing the upper-case characters and the printing-point of the paper into alinement. In type-writing machines of the class illustrated it is customary to move the type-wheel so that its upper-case characters (in the machine shown those arranged on the lower row of the type-wheel) are brought into position relatively to the printing-point to correctly impress the type upon the printing movement of the swinging frame. I provide a shift-lever for raising the wheel to the upper-case position, an auxiliary lever for effecting this same movement and holding the wheel in the upper-case position, and a second or reshifting lever for returning the wheel to its normal lower-case position against the action of the auxiliary lever. As shown, the shaft $a$ of the type-wheel B extends vertically entirely through the frame $b$, so that its lower end projects below said frame a distance at least equal to the degree of movement of the type-wheel from the upper to the lower case positions.

I will now describe the shifting mechanism with reference to Figs. 5, 6, 7, and 34. I provide a shift-lever K, shown as fulcrumed at its rear to a lug K', cast integrally with the base of the machine, and as formed at its front end with an arm or toe $K^2$, projecting under the lower end of the type-wheel shaft $a$. The shift-key lever $K^3$, the auxiliary lever $K^4$, and the reshifting-lever $K^5$, Figs. 1 and 34, act through the shift-lever K to produce the appropriate shifting movements of the type-wheel B. For operating the shift-lever K to move the type-wheel B to the upper-case position and for returning it from this position against the action of the auxiliary lever $K^4$, I employ cams L and L', respectively, the cam L acting to raise the shift-lever K upon depression of the shift-key lever $K^3$ and the cam L' acting to depress the shift-lever K when moved by the reshift-key $K^5$. I provide a single shaft $L^2$, extending transversely of the key-levers and mounted in bearings in the sides of the base A', this shaft forming the fulcrum about which the cams L L' may oscillate and itself adapted to be rotated by the auxiliary lever $K^4$ to hold the type-wheel in the upper-case position. Each of the cams L L' is preferably fixed upon a sleeve $L^3$ $L^4$, Fig. 3, which sleeves turn freely upon the shaft $L^2$ and carry at their outer ends downwardly-projecting arms $L^5 L^6$, which are engaged by the shift-key lever $K^3$ and the reshift-lever $K^5$, respectively. Each of the cams L L', with its sleeve and arm therewith, constitutes, essentially, an elbow-lever fulcrumed on the shaft $L^2$. The sleeves $L^3$ $L^4$ are rendered desirable because of the fact that the shift-levers are conveniently located at the ends of the keyboard, while the type-wheel and the shift-lever K are located centrally of the machine, and it is hence necessary to communicate the movements of the shift-key levers to the shift-lever K a distance approximating half the width of the machine. This might be done by increasing the width of the shift-lever K; but I prefer the construction shown because of its lightness of weight. The cam L, actuated by the shift-lever $K^3$, is formed with suitable cam-faces $o$, which act against the pin or stud $o'$, carried by the lever K, to move the latter upwardly when the cam L is moved by its lever $K^3$, which cam-faces are so formed as to hold the lever in its upward position while the shift-key lever $K^3$ is held depressed and to permit the descent of the lever K when the shift-key lever $K^3$ is released, this lever being ordinarily used when a single upper-case character is to be immediately followed by a lower-case character. The auxiliary lever $K^4$ is fixed to the shaft $L^2$ between the outer end of one of the sleeves $L^3$ or $L^4$ (as shown, $L^3$) and the frame of the base, Fig. 3, and is adapted to rotate this shaft to raise the shift-lever K, and, when desired, to hold said lever and the type-wheel in the upper-case position. The means for effecting this comprises an arm $o^3$, fixed to the shaft $L^2$ between the inner ends of the sleeves $L^3$ and $L^4$, which arm carries a spring-arm $o^5$, which acts against an arm $o^4$, fixed to the shift-lever K. The arm $o^5$ acts upon depression of the auxiliary lever $K^4$ against the arm $o^4$ to raise the shift-lever K and to hold it yieldingly in its raised position. The auxiliary lever $K^4$ may be held in its depressed position by a notch or stop $K^6$, Fig. 7, formed integrally with one of the standards $A^3$, thus holding the type-wheel B in the upper-case position. This lever $K^4$ is designed for use where a number of upper-case characters are to be printed, and should a lower-case character occur the type-wheel may be moved to the lower-case position by the reshifting-lever $K^5$ acting against the shift-lever K through the cam L', Fig. 34. The cam L' is formed with a suitable cam-face $o^2$ for engaging a stud or pin $o'$, carried by the lever K to depress this lever and allow the downward movement of the type-wheel shaft $a$. As the cam L' acts to move the lever K against the action of the spring $o^5$, a release of the reshifting-lever $K^5$ will immediately permit this spring to again operate to move the wheel to the upper-case position. In order that the frame $b$ may tilt freely during the printing operation when the type-wheel is in the upper-case position, the toe $K^2$ of the shift-lever K is preferably formed on its upper side in the arc of a circle of which when the lever K is raised the pivotal axis of the frame $b$ is a center. During the swinging movements of the frame $b$ the lower end of the type-wheel shaft $a$ may thus move along the toe $K^2$ without altering the relative vertical position of the type-wheel B. The lugs $K'$, to which the shift-lever K is fulcrumed, are preferably slotted, as shown, through which slots the fulcrum-screws $K^7$ extend, which may be clamped in their adjusted positions by suitable set-screws $K^8$, as best seen in Figs. 1 and 34.

Of course the shift and reshift levers $K^3$ and $K^5$ should not act to depress the differential levers E E', and these levers are therefore preferably mounted in the frame beyond the ends of their differential plates $g$ $g'$, as shown in Fig. 4. The levers $K^3$ and $K^5$ are in common with the key-levers provided with projecting arms $D^2$ for guiding them; but these projections are beyond the path of movement of the shuttle, and hence do not act to limit the movements of the latter. The downward movements of these levers may be limited by stop-pins $d^3$, fixed to the casting G, which act against stop-shoulders formed on the projecting arms $D^2$, as best seen in Figs. 3, 7, and 34, which stops are adjusted to bring the type-wheel to the exact height desired. The shift-levers $K^3$ $K^5$ are shown as notched or recessed at their under sides at $m^3$, so that they do not engage the fulcrum-rod $g^2$ of the differential levers E E', and at $m^4$ to avoid engagement with the universal bar $R^2$.

As an incident to the use of a shifting mechanism which acts to longitudinally displace the type-wheel shaft $a$ the parts which rotate with this shaft must be so formed as to remain in operative positions during such displacement of the shaft. The means I prefer to employ for accomplishing this result are shown in Figs. 5 to 8. The pinion $c$ is made large enough to remain in mesh with the rack $e$ during the up or down movements of the shaft $a$. It is necessary that the gear $a'$ should remain constantly in mesh with the rack $i$ of the shuttle during the vertical displacement of the shaft $a$. To effect this, the gear $a'$ is fixed to a hub or sleeve $a^4$, loosely mounted upon the shaft $a$, and is rotated by the shaft by means of a cage $a^5$, fixed to the shaft and having pins fitting through holes formed in the gear $a'$. These pins are of sufficient length to remain in engagement with the gear $a'$ during the action of the shifting mechanism, the two extremes of movement being shown in Figs. 5 and 7. The gear $a'$ is held against undue vertical movement by the lower part of the frame $b$, which serves to limit the movement of the hub $a^4$, and the stop-face $b^3$, which serves to limit the upward movement of the gear. The frame $b$ may carry suitable stops $b^4$ to act against the cage $a^5$ to prevent undue movement of the shaft $a$, so that the type-wheel B cannot be moved by the shift mechanism past the proper upper-case position. As the star-wheel $a^2$ is fixed to the shaft $a$ and is displaced with it, its stop projection $a^3$ is formed of sufficient height to insure its engagement with the star-wheel notwithstanding the movement of the latter during the operation of the shift mechanism.

*The type-wheel.*—The construction of the type-wheel is best shown in Fig. 7. It is preferably of molded rubber, with the types formed integrally therewith. In forming the type-wheel a suitable hollow ball of soft rubber is perforated to receive a hub $B^7$, and after being filled with water in a usual manner the ball is placed in a mold and heated, so that the water expands to drive the walls of the ball into the depressions of the mold, after which the wheel is vulcanized in the usual manner. The hub $B^7$ is thus molded in the wheel and by reason of its formation strengthens the wheel in use. Another advantage of this method of construction is that the hub $B^7$ may be bored prior to the molding operation and during such operation held in the mold in its proper position by a pin passing through such bore. Much more uniform and accurate type-wheels may thus be formed than when the hub is fixed to the wheel after the formation of the latter.

The type-wheel and its shaft $a$ are provided with reciprocal provisions for preventing rotation of the wheel relatively to the shaft, and the shaft is provided with means for holding the type-wheel against relatively vertical movement. As shown, the shaft has fixed at its upper end a shoulder or flange $p$, which when the type-wheel is in place limits the downward movement of the latter and is formed at its upper end with a hole $p'$, through which is passed a cotter-pin $p^2$. I preferably interpose between the cotter-pin and type-wheel a spring-washer $p^3$, by which means the wheel is held firmly against the shoulder $p$. As shown, the type-wheel is formed near its hub with holes $p^4$, through which fits a pin $p^5$, fixed to the flange $p$, which insures a non-rotative engagement between the shaft $a$ and type-wheel.

My invention provides a novel arrangement and mode of operation of the type-wheel relatively to the printing-point. By this means I am enabled to provide a type-writing machine capable of printing the maximum number of characters of standard size (eighty-four in the construction shown) with a type-wheel in which the characters are arranged in two rows. It has heretofore been customary to arrange the types in three rows and to use two shifting mechanisms, one to bring each of the second and third rows to the printing position. This has been necessary, because upon increasing the diameter of the type-wheel to the extent necessary to include the types in two rows it has been found that the two types adjacent to the selected character would leave a partial imprint upon the paper or at least press the ribbon against the paper sufficiently to smudge the latter. To effect my present result, I cause the wheel to strike the paper (or vice versa) in such position that the type does not squarely contact with the latter, but that one side of the type contacts slightly in advance of the opposite side. This relative adjustment (shown at $N^2$ in the diagram Fig. 36) results in leaving the type on one side of the selected character such a distance from the paper that it will not smudge the latter, but brings the type upon the other side of the selected character into closer proximity with the paper than it would occupy if the selected type were moved squarely against the paper. This would result in smudging the paper were it not that I provide means for preventing such smudging. This may be accomplished in various ways; but I prefer the simple and effective means shown in the drawings, which comprises a plate of thin metal or other material $p^6$, Figs. 31 and 32, interposed between the paper and the ribbon N at a point which corresponds to the position of the type which is next to the right of the selected character, and hence prevents the impression of this type upon the paper. The same result may be also obtained by so arranging the ribbon relatively to the type-wheel that its inked surface will not be interposed between the paper and the type the impression of which is to be avoided. This is conveniently done with the form of ribbon shown by mounting the ribbon so that its edge does not extend beyond a point intermediate of the selected character and the next succeeding one, as shown at N in Fig. 36. The adjustment of the type-wheel to cause one portion of the type to contact with the paper slightly in advance of the other portion may also be accomplished in various ways; but I have obtained good results in use by so mounting the type-wheel upon its shaft that the selected character is carried slightly past the theoretically-correct printing position or is arrested at a point slightly in advance of this position. I have found in practice that this slight deviation from the theoretically-correct position is sufficient to accomplish the results hereinbefore set forth, but does not cause any distinguishable variation of the impression—that is to say, the advanced side of the type appears to make practically the same impression as the side which subsequently contacts with the paper. The same result may be accomplished by bringing each type to the theoretically-correct printing position, but so forming the type that one side projects from the periphery of the type-wheel a distance slightly exceeding that of the other, as shown at $N^3$ in Fig. 36.

*Feed mechanism.*—My invention provides certain minor improvements in the feed mechanism for the carriage, which comprises, as usual, a mainspring-wheel, which is connected to the carriage, so that it exerts a constant tendency to move the latter from right to left, and a dog or dogs coöperating with a rack carried by the carriage to control the movements of the latter when the dog and rack are moved relatively to each other by the key-levers through the medium of the usual universal bar. In the construction shown the rack is fixed against relative transverse movement and the dogs are connected to the universal bar to be oscillated thereby upon depression of a key. These parts are in the main of the usual construction, but present certain features of improvement, which I will now describe with reference to Figs. 5, 6, and 35. I provide a mainspring-wheel Q, Fig. 7, which is formed on one side of its hub with a journal $q$, by means of which the wheel Q is mounted to rotate in a depending lug $q'$, formed integrally with the top plate $A^2$. The journal $q$ passes through a suitable hole formed in the lug $q'$ and is formed with a screw-threaded socket, into which is tapped a screw $q^2$, which also passes through a bell $q^3$, the single screw $q^2$ thus serving to mount both the bell and wheel Q in the lug $q'$. In the construction shown the bell $q^3$ is held firmly against the journal $q$, and thus rotates with the wheel Q. This rotation of the wheel is of course immaterial, being merely an incident to the construction shown. The mainspring $q^4$ encircles the hub of the wheel Q, being fixed at its inner end to a projection $q^5$, carried by the hub, and at its outer end to a projection $q^6$, carried by the lug $q'$. The wheel Q has a peripheral groove forming a guide for the usual cord or chain $q^7$, which is fixed at one end to the periphery of the wheel and at its other end to the carriage C, as is common. To vary the tension upon the carriage, the cord $q^7$ is passed around the wheel Q in such manner as to give it a complete rotation, either to increase or decrease the tension of the spring $q^6$, when the cord may be again adjusted in its guiding-groove. The lug $q'$ is slotted at $q^8$, as shown in Fig. 7, to receive the upper end of the bell-hammer $q^9$, (shown in Fig. 6,) which is fulcrumed in said slot so that its upper end extends into the path of a projection $q^{10}$ upon the carriage C, which engages the bell-hammer at the proper time.

For controlling the movement of the carriage against the tension of the mainspring I prefer to employ a pair of dogs $r\ r'$, Figs. 5, 6, and 35, pivoted to the top plate $A^2$, and a longitudinal rack $r^2$, fixed to the carriage. These dogs $r\ r'$ operate in the usual manner, the one, $r$, being fixed against oscillation in one direction and the other, $r'$, being capable of oscillation in opposite directions. Both dogs are in the construction shown horizontally pivoted to a vibrating dog-lever R, which is fulcrumed between screws $r^3$ in lugs formed on the top plate as shown in Fig. 35 and in dotted lines in Figs. 2, 5, and 6. The ends of the lever R are connected by suitable rods R' to a universal bar $R^2$, arranged in the path of movement of the type-levers. The lever R is moved by these levers against the tension of its spring $R^6$, as usual. I form one of the dogs—for instance, $r'$—at its under side with a depression or notch $r^4$, and I fix to the lever R a flat spring $r^5$, which is bent at one end to engage the notch $r^4$, (best seen in Fig. 35,) so that the dog may move against the tension of the spring, either against the stop $r^6$ during the normal operation of the dog or may tilt in an opposite direction to allow the rack $r^2$ to move past it when the carriage C is moved to the right to its initial position. The dog may, if desired, be formed with a projection and the spring with a reciprocal bent portion or notch to effect this same result. A single flat spring thus suffices to effectively actuate the movable dog $r'$ with a considerable gain in simplicity and cost. The second dog $r$ is held yieldingly against the stop $r^6$ by a flat spring $r^7$, which at one end passes partially around the dog and at the other end is fixed to the lever R.

The universal bar $R^2$ in the construction shown extends transversely beneath both series of key-levers and the spacer-levers $R^3$, the latter being formed at their under sides with lugs $R^4$ for holding the universal bar in its proper position. The bar $R^2$ is preferably formed as a tube, having holes at each end which are adapted to receive the ends of the rods R', the latter being adjustably held to the bar by suitable set-nuts, as shown in Figs. 5 and 6. The universal bar is equidistant from the under faces of each of the key-levers D and spacer-levers $R^3$, so that a predetermined depression of any of these levers results in the forward feed of the carriage. The spacer-levers $R^3$ are preferably fulcrumed at their rear ends upon the fulcrum $d$ and at their front ends are preferably bent angularly, as shown, and the spacer-bar $R^4$ is formed with longitudinal slots $R^5$ at its under side, as clearly shown in Fig. 4, which fit over the bent ends of the spacer-levers $R^3$, thus making a simple and effective connection between the spacer-bar and its levers. Set screws or pins passing through the bar and levers may be provided, as shown in dotted lines, to insure against separation of these parts.

*Line-locking mechanism.*—It is desirable that the printing mechanism be locked at or near the end of the line, so that several characters cannot inadvertently be printed one upon the other. My invention provides a novel means for accomplishing this result and also certain improvements in such mechanism whereby the line-locking device may be rapidly adjusted to operate at one or another point in the movement of the carriage. I will describe the means shown for stopping the carriage and locking the printing mechanism at the end of the line with reference to Figs. 5, 33, and 43. At the rear of the frame near its middle is pivoted a detent S, which consists of two arms $s\ s'$, the latter of which is formed at its lower end with a hook $s^2$, adapted to engage the lever R. A plate $s^3$ is fixed to the under side of the carriage C and acts normally against the arm $s$ to hold the arm $s'$ out of engagement with the lever R. The plate $s^3$ carries a suitable stop, which in the construction shown comprises a notch $s^4$, into which the arm $s$ may enter, whereupon the arm $s'$ moves into engagement with the lever R. This locks each of the key-levers against the universal bar $R^2$, thus preventing these levers from tilting the differential plates $g\ g'$, and hence from moving the rack $e$ to rotate the wheel or to swing the latter to the printing-point. As the lever R is held against downward movement by the detent S, this lever cannot be vibrated to move the dogs $r\ r'$, and hence the carriage is locked against further movement to the left. The line-locking mechanism may be released to allow the printing of an additional character or characters by an unlocking device S', extending to the front part of the machine, which I will describe with reference to Fig. 33. The unlocking means S' comprises a movable rod or plate sliding along the under side of the top plate $A^2$ and normally held inoperative by a spring $s^5$, which holds the plate in its retracted position. The inner end of the latter extends below the lever R, as shown, and engages an arm $s^6$, fixed to the detent S. When the line-locking device has operated and it is desired to print an additional character or characters, the unlocking device S' is pressed in, with the effect that the detent S is tilted by its arm $s^6$, so that the hook $s^2$ is moved from engagement with the lever R, leaving the latter free to vibrate, and unlocking the universal bar $R^2$, so that the latter may be moved by the depression of a key-lever to oscillate the feed-dogs and permit the printing of an additional character. When the detent S is tilted, the arm $s$ moves from engagement with the notch $s^4$ in the plate $s^3$ and remains out of engagement therewith so long as the unlocking device S' is held pressed in. If, however, with the mechanism thus far described the unlocking device S' were released and retracted by its spring $s^5$ before another movement of the carriage took place, the arm $s$ would again move to engage the notch $s^4$, and the parts would be again locked. This would necessitate holding the unlocking device S' pressed in while the next character was being printed, thus permitting the carriage to feed forward a space to move the notch $s^4$ out of coincidence with the arm $s$. To avoid this necessity, I provide means for holding the unlocking device in its displaced position until the carriage has been moved by the depression of a key or space lever to sufficient extent to prevent reëngagement of the arm $s$ with the notch $s^4$, a movement of one space being ordinarily sufficient to effect this result. I hence provide a catch $s^7$, fixed to the unlocking device, which when the latter is pressed in is adapted to move into engagement with any suitable part which partakes of the movements of the universal bar. In the construction shown I conveniently utilize the dog-lever R and form the catch $s^7$ with a hooked outer end, which is adapted to engage the upper side of the lever R when the unlocking device S' is displaced. By this means the unlocking device is held in its displaced position and the detent S is held in inoperative position until the next succeeding movement of a key or space lever has fed the carriage forward a single space, whereupon the lever R moves out of engagement with the catch $s^7$, and the unlocking device S' is permitted to move under the tension of its spring $s^5$ to its retracted or inoperative position. The arm $s'$ is shown as provided with a weight $s^{10}$ for causing the detent to engage, or a suitable spring may be used for this purpose. If but one line-lock stop-notch $s^4$ is used, the detent S is held in inoperative position by the lower face of the plate $s^3$ until the carriage is finally stopped by reaching the limit of its movement. The notch or notches $s^4$ are so formed that upon movement of the carriage to the right to its initial position for starting a new line the arm $s$ of the detent S may ride into and out of engagement therewith. During this movement when such engagement takes place the detent S will momentarily act to lock the dogs; but this is of no consequence.

It is to be understood that as many line-lock notches $s^4$ may be used as are desired or as are convenient in particular kinds of work. I prefer, however, to form a plurality of such stop-notches in the plate $s^3$ and to provide means whereby one or more of these notches may be maintained in operative position, this feature being seen in Fig. 43, which shows the plate $s^3$ detached. This is accomplished in the construction shown by forming a series of notches in the plate $s^3$, said notches being spaced apart equidistantly or otherwise, and providing a second plate $s^8$, which is adapted to slide along the plate $s^3$ to close or open one or more of the notches of the latter. In the form shown the plate $s^8$ is formed with a corresponding series of notches $s^9$, arranged with reference to the notches $s^4$ according to the vernier method, whereby a comparatively small movement of the sliding-plate $s^8$ will result in bringing some one of its notches $s^9$ into coincidence with any one of the notches $s^4$ that it may be desired to use. One of the plates may be provided with graduations, as shown on the plate $s^8$, to indicate the movement necessary to bring a certain notch into operation. This device is well adapted for use where a considerable number of line-locking notches are to be employed arranged some distance apart across the carriage, as it enables the rapid adjustment of the line-locking point by means which need not extend unduly beyond the side of the carriage, which latter would be the case were the sliding plate $s^8$ formed with a single notch adapted to be brought successively into alinement with the several notches $s^4$. Where the notches are to be grouped close together at one end of the plate $s^3$, the vernier arrangement is rendered unnecessary and the device last referred to may be employed. It will be understood that with either of these arrangements any convenient number of notches may be coincidently brought into operation, this being merely a matter of formation of the plates $s^3$ and $s^8$.

*Tabular stops.*—My invention provides a tabular-stop mechanism of extreme simplicity and efficiency by which the carriage is released from its engagement with the feed-dogs and is caused to jump or skip quickly to a certain point corresponding to the stop actuated and there arrested, its reëngagement with the dogs occurring upon the release of the stop. My invention further provides certain improvements in tabular stops whereby the same stop may be operated to release the carriage and to arrest it when it is moving in the normal direction and also to arrest the carriage in such manner as to act as a marginal stop when the carriage is being moved in the reverse direction for beginning a line. My invention also provides means whereby such a stop may be locked in the path of the carriage to act as a fixed right or left hand marginal stop. The tabular-stop mechanism is best shown in Figs. 2, 5, 6, 7, and 47.

As shown in dotted lines in Fig. 2, the stops T are seven in number (although any suitable number may be employed) and are spaced equidistantly along the under side of the top plate $A^2$ to stop the carriage at certain points in its path of movement, preferably at every tenth space. An additional stop $T^{11}$ is added to the right of the stops T and is adapted in the construction shown solely for use as a margin stop, as hereinafter described. Each stop T is formed with or carries at its front end a handle or button T′, which projects through the depending flange $A^4$ of the top plate, so that it may be conveniently manipulated by the operator. As shown, each of the stops T comprises a longitudinally-movable bar or rod fitted to slide in front and rear bearing lugs or flanges $t\ t'$, respectively, formed in the top plate, as shown in Figs. 5, 6, and 7. A spring $t^2$, encircling each stop T between the flanges $A^4$ and $t$, acts against a pin $t^3$ to normally hold the stop in its protruded position. In order to produce the desired operation of the stops T in a machine of the character shown, it is necessary to disengage the feed-dogs from the feed-rack, so that the carriage may be free to move under the tension of its spring until arrested by the stop. To accomplish this, I provide a plate $t^4$, Figs. 5, 7, and 38, which extends transversely of the machine in front of the dogs $r\ r'$, said plate being preferably bent at its ends to form arms $t^5$, which latter are pivoted to lugs $t^6$, formed integrally with the top plate $A^2$ at each side thereof. The plate is thus capable of being tilted rearwardly to move the dogs $r\ r'$ out of engagement with the rack $r^2$, but normally lies forwardly of the dogs, so that it has no effect to interfere with their movements, as shown in Fig. 5. Each of the stops T carries at its rear an arm $t^7$, which is bent angularly, so that it passes beneath the rear bearing-plate $t'$ in position to engage the pivoted or tilting plate $t^5$ when the stop is displaced. The arm $t^7$ thus acts when the stop is moved rearwardly to tilt the plate $t^5$ into engagement with the dogs $r\ r'$, as best seen in Fig. 7, and move the latter rearwardly out of engagement with the rack $r^2$, thus releasing the carriage from the restraint of the dog and permitting it to move under the tension of its spring until arrested by a stop projection $t^8$, which is simultaneously interposed in its path of movement. This stop projection $t^8$ may be formed in any suitable manner, but conveniently comprises the end of the stop T, which when the stop is pressed back projects through the flange $t'$ a sufficient distance to form an obstruction in the path of movement of the carriage. This projection may engage any suitable stop-face upon the carriage—as, for instance, that shown at $u$, Figs. 41 and 42—which comprises a block fixed to the carriage at about its longitudinal center and so formed as to engage the stop projection $t^8$ of any of the stops T when the latter is projected in its path. The operation of such tabular stops is well known and consists merely in pressing the button T′ to release the carriage and holding it in until the carriage is arrested. Upon release of the stop its spring $t^2$ acts to move it outwardly, thus allowing the dog-lever R to move under the tension of its spring to again engage the feed-dogs with their rack and hold the carriage in its arrested position until moved by a space or key lever.

My invention provides a novel arrangement and construction of tabular stops in that I may simultaneously vary the points of action of the series of tabular stops, so that they will act to arrest the carriage at points which may vary from the normal or indicated positions. To effect this, I make the stop-face $u$ movable longitudinally relatively to the carriage and preferably provide an operating arm or slide $u'$, extending to one end of the carriage, where it may be conveniently manipulated, and means for adjusting this arm so as to fix the stop-face $u$ in its different positions. The slide or arm $u'$ may be conveniently mounted upon the feed-rack $r^2$, as shown in Fig. 42, so that the stop-face $u$ may be adjustable longitudinally of the rack at the left of the front roll $z'$. The slide $u'$ may have a series of notches $u^3$, which are adapted to be engaged by a pin or projection $u^4$, fixed to the rack, and the slide in this case is preferably of sufficient elasticity to spring upwardly, so that any one of its notches may engage with the pin. The stop-face $u$ preferably has a movement equal to the distance between two adjacent tabular stops, in the construction shown this movement consisting of ten spaces. By this means the entire series of tabular stops which normally operate at 10, 20, 30, &c., respectively, may be made to operate at 11, 21, 31, &c., or at 15, 25, 35, &c., or at other suitable points in the path of movement of the carriage.

I preferably provide a brake for braking the carriage during the operation of the tabular stops and preferably so construct the brake that the braking pressure will be under control of the operator and be variable according as the tabular stops are pressed with more or less force. As shown in the present construction, I fix a brake-shoe $u^5$, Figs. 7 and 38, to the tilting plate $t^4$ in such manner that it will engage the periphery of the main spring-wheel Q when the plate $t^4$ is tilted rearwardly by the action of the arms $t^7$, as seen in Fig. 7. Upon release of any tabular stop the brake $u^5$ is released, the tilting plate $t^4$ moving to its inoperative position. (Shown in Figs. 5 and 6.) In Fig. 6 the brake is omitted to avoid confusion.

Each of the stops T′ is, according to my present invention, adapted to operate as a marginal stop, this being effected in the present construction by the use of a second stop-face $u^2$, Figs. 41 and 42. When used as a marginal stop, the selected stop T' will be pressed with one hand while the carriage is being moved to the right with the other, and upon engagement of the stop-face $u^2$ with the stop the latter may be released, the carriage being held in the selected position by the reengagement of the feed-dogs with the feed-rack. I have shown the second stop-face $u^2$ as fixed, although it may, if desired, be made adjustable in the manner described with reference to the stop-face $u$, or otherwise.

The stop-face $u^2$ is so mounted upon the carriage that when the tabular stops are operated as marginal stops the carriage is arrested at a point ten spaces farther to the left than is indicated by the numbers of the stops. Thus the first stop T' (marked 10) acts to arrest the carriage at the point 20. The stop $T^{11}$, while identical in construction with the stops T', is so located upon the machine, as shown in Fig. 2, that it can be used only as a marginal stop. Being so used, it acts to arrest the carriage at the tenth space from the right.

I preferably provide means for locking one or more of the tabular stops in position, so that they may be used as stationary marginal stops. In Figs. 2, 7, and 47 I have shown a device suitable for this purpose which comprises an angular plate $u^6$, adapted to slide along the under side of the top plate and which carries a spring $u^7$, adapted to frictionally engage the under side of one or another of the stops T when the latter is displaced. The inner stop-faces $t^8$ of the stops T in this construction are made with such degree of projection that they are moved into the path of the stop $u$ before the arm $t^7$ acts to throw the dogs out of engagement, and hence limit the movements of the carriage to the right, while still permitting its feed mechanism to operate. While in the drawings I have shown the last-named locking mechanism as adapted to lock only the two right-hand tabular stops T, (exclusive of the stop $T^{11}$,) it is obvious that means may be provided for locking any one of the stops, although it will not ordinarily be necessary to provide means for locking the stops at the left-hand side of the machine.

In a type-writing machine of the construction shown in order to not interfere with the swinging frame $b$ of the type-wheel I bend one of the stops (that indicated at 30, Fig. 2) so as to pass around the frame, this being clearly shown in Figs. 2 and 7.

*The carriage.*—My invention aims to provide a carriage of the utmost simplicity of construction which will be strong and durable and which will be capable of performing all of the modern requirements—that is to say, one in which the paper is accurately guided to the platen and held thereon, in which the line-spacing mechanism is capable of varied adjustments to feed the paper a greater or less extent at each operation, in which a general carriage-release is present, by means of which the feed mechanism is thrown out of operation, so that the carriage may be freely moved in either direction, and in which means are provided for passing to a position to the right of that set by the ordinary margin-stop when desired, so that the beginning of the writing-line on the paper may be advanced to the left. The carriage embodying my present invention is partly shown in Figs. 1, 2, 5, 6, and 7 and in detail in Figs. 37 to 41. The main frame of the carriage C, as shown in Fig. 37, is formed of a single piece of sheet metal, the bottom plate $c'$ having formed integrally therewith the feed-rack $r^2$, the line-lock plate $s^3$, and other accessory parts, which will be specifically referred to. In constructing the frame of the carriage a suitable rectangular plate of sheet iron or steel is stamped to substantially the form shown in Fig. 37. The rack $r^2$ is formed upon the inner edge of the blank, as shown, and after its teeth have been milled or otherwise cut the rack is bent at an angle to the plate $c'$. This plate is cut along the line $s^8$, leaving a longitudinal plate or tongue, which is bent at $s^9$ to form the line-lock plate $s^3$. At the ends of the plate $c'$ are formed enlarged portions $c^2$ $c^3$, which after the rack is formed are bent up at right angles on the lines $c^{10}$ $c^{10}$ and serve to form bearings for the platen C', the line-spacing, margin-stop, and general carriage-release mechanisms. The end portions $c^2$ $c^3$ are formed with notches or recesses $c^4$, into which the shaft of the platen fits and through which the latter may be inserted and removed to substitute one platen for another. The end portion $c^3$ is formed with a series of recesses or holes $c^6$, which are adapted to be engaged by a stop for adjusting the limits of movement of the line-spacing mechanism. Both end portions $c^2$ $c^3$ are formed with notches $c^7$, which when these portions are bent to shape serve to limit the movements of the paper-guide device. At rear of the frame $c'$ are formed projecting tongues $c^8$, which serve to mount the rear carriage-rollers, and these tongues are in turn formed with lips $c^9$, which are bent angularly to hold the carriage to its guide-rod, as will be described. At the front of the frame $c'$ are formed two projections or tongues $v^2$ $v^3$, which serve as pointers for moving along a graduated scale to indicate the position of the carriage. The end portions $c^2$ $c^3$ when bent to shape are connected by a strengthening rod or brace $c^{11}$, Figs. 5, 6, and 7.

I will now describe the carriage in detail. The platen C', Fig. 6, preferably comprises a roller of wood or other suitable material $C^2$, which has a rubber facing $C^3$, molded or otherwise fixed in place in any well-known manner. The roller $C^2$ has fixed at each end suitable pins or shafts $C^4$, which are adapted to fit in the notches or recesses $c^4$ of the frame, so that they project beyond the ends thereof, and the frame is provided at each end with a catch $C^5$, Figs. 38 to 40, which catches are pivoted at their lower ends to the angular end portions $c^2 c^3$ and are formed with notches $C^6$, which when the catches are moved to the vertical position (best seen in Figs. 39 and 40) engage the pivots or shafts $C^4$ of the platen and hold the same firmly in position. When it is desired to remove a platen, the catches $C^5$ are swung backwardly until their notches clear the shaft $C^4$, when the platen may be lifted out. The platen is preferably provided with usual knobs $C^8$, which are fixed to the shafts $C^4$ and serve to turn the platen independently of the line-spacing mechanism, which I will now describe with reference to Figs. 38 and 39. To one of the shafts $C^4$ is fixed a ratchet-wheel $w$, and mounted upon this same shaft and free to turn thereon is a line-spacing lever W, which is preferably formed as a plate of circular shape provided with a suitable operating-handle W'. Pivoted to the plate W is a spring-pawl $w'$, which is normally held in engagement with the teeth of the ratchet-wheel $w$. A stop $w^3$, bent up from the angular end plate $c^3$ of the frame, serves to limit the rearward movement of the plate W. The plate W is confined between the angular end plate $c^3$ and a stop device $w^5$. This latter is formed as a circular plate pivotally mounted upon the shaft $C^4$ and is formed with an arm $w^6$, which latter carries a spring-handle or knob $w^7$, which has fixed to it a stop-pin $w^8$, adapted to enter one or another of the holes or recesses $c^6$, formed in the angular end plate $c^3$. (See dotted lines in Fig. 2.) These recesses, as shown in Fig. 39, are arranged in the arc of a circle of which the shaft $C^4$ is the center, and the stop device $w^5$, fulcrumed at this center, may be moved to engage any of the recesses $c^6$, so that it constitutes an adjustable stop in the path of movement of a stop-shoulder $w^4$, formed on the plate W. The plate W is formed at its under side with a projection $w^9$, to which is attached one end of a spring $w^{10}$, the other end of the latter being fixed to the angular plate $c^3$. This spring serves to retract the lever W', with its pawl $w'$, after the latter has been moved to rotate the platen to feed the paper. During the retraction of the lever W' the platen is held against rotation therewith by a pawl $w^{11}$, pivoted to the end plate $c^3$, which acts against the ratchet $w$, as shown in Fig. 39.

I provide for the carriage improved means for guiding the paper to the platen and holding it against the latter, this consisting, as shown, of a guiding-plate X, Figs. 6 and 40, extending above the top face of the platen, partly encircling the platen at its under side and formed at its front side with a series of spring-fingers $x$, Fig. 41, which are designed to lightly contact with the platen for holding the paper thereto. I preferably provide a paper-roll X', which extends longitudinally of the platen near the printing line, and to provide supporting-points for this roll I form two of the fingers $x$, preferably those at the ends of the carriage, so that they extend beyond their fellows, and upon each of these fingers (designated by the reference-letter $x'$, Fig. 40) I form a lug $x^2$, which projects angularly therefrom. The lugs $x^2$ are formed with suitable holes to receive pins $x^3$, which are fixed to the ends of the roll X', so that the latter may rotate in the bearings thus formed. To hold the platen X, with its fingers $x$ and roller $x'$, in position, I fix to the under side of the plate a rod or bar $x^4$, Figs. 5, 6, and 7, which is formed with reduced ends fitting in the slots $c^7$, formed in the end plates $c^2 c^3$ of the carriage, as shown. For holding the plate X and its roller yieldingly against the platen I provide a spring $x^5$, Fig. 5, which is shown (see dotted lines, Fig. 38) as a flat bow-spring bearing against the rod $x^4$ at its ends, with its middle resting upon the main plate $c'$ of the carriage. This single spring suffices in the construction shown to hold the paper firmly in position between the plate X and roll X' and the platen C'. As the rod $x^4$ may move in its slots $c^7$ against the tension of the spring $x^5$, the carriage may accommodate paper of different thicknesses or a number of sheets, thus fitting the machine for manifold-work.

My invention provides a simple and efficient general carriage-release which acts to move the feed-dogs out of engagement with the feed-rack, whereby the carriage may be moved in either direction for setting it at a desired position in a usual manner. This device is shown as a movable bar or plate Y, pivoted at $y$ to the end plates $c^2 c^3$ of the carriage in such manner that it extends longitudinally of the carriage below the lower plate $c'$ thereof, as best seen in Figs. 38, 39, and 40. One end of the plate Y is continued above its pivotal point $y$ and is formed as a handle Y'. A spring $y'$, Fig. 40, fixed at one end to the handle Y' and at its other end to the end plate $c^2$ of the carriage, serves to hold the plate Y in its retracted or inoperative position. In this position it is normally held out of contact with the feed-dogs $r\ r'$, as shown in Fig. 6. When it is desired to release the carriage, the handle Y' is moved forwardly, whereupon the plate Y moves back and acts to move the feed-dogs out of engagement with the feed-rack, thus releasing the carriage and permitting its movement in either direction to the desired point. As the plate Y extends the entire length of the feed-rack, it will be understood that in no matter what position of the carriage, the general release may operate as thus described. When the handle Y' is released, its spring $y'$ acts to move the plate Y out of engagement with the dogs, which thereupon return to their normal position in engagement with the feed-rack.

The carriage may be mounted to move upon the frame in any suitable manner; but I prefer that the top plate $A^2$ carry or be formed with two suitable guides Z Z', the front guide Z, Fig. 5, being shown as a way formed integrally with the top plate and the rear guide Z' being shown as a bar screwed or otherwise secured to said plate. These guides are shown in Figs. 1, 5, 6, and 7 in full lines and in dotted lines in Figs. 39 and 40. I preferably provide the carriage with two bearing rolls or wheels $z$ at rear and a single roll $z'$ at front. To form suitable supporting means for the roll $z$, I form tongues $c^8$ $c^8$ (shown in Fig. 37) and subsequently bend these at an angle to the bottom plate $c'$, as shown in Figs. 39 and 40. The rolls $z$ are mounted upon these tongues $c^8$ by means of suitable pivot pins or screws $z^2$, the inner ends of which are fixed in any suitable manner to the tongues, as by screw-threads or otherwise. The lips $c^9$ of the tongues $c^8$ are bent angularly to the latter in such manner that they extend beneath the guide-rod Z' and hold the carriage against vertical movement relatively thereto. The front guide-roll $z'$ is mounted to rotate upon a shaft $z^3$, which is riveted or otherwise fixed to the front side of the bottom plate $c'$ of the carriage.

My invention provides a simple and effective marginal stop for the carriage, which is shown as adjustable on the latter and adapted to move against a fixed abutment upon the top plate. This stop mechanism comprises a block $Z^2$, Figs. 2, 6, and 41, adapted to slide along a notched bar $Z^3$, which is mounted at its ends in the end plates $c^2$ $c^3$ of the carriage-frame in such manner that it may oscillate therein. The block $Z^2$ is provided with a catch $z^4$, which is adapted to engage a fixed abutment or shoulder $z^5$, formed on the top plate $A^2$. A suitable stop pin or shoulder $z^{11}$, Fig. 41, is formed upon the block $Z^2$, which prevents the catch $z^4$ from yielding during retraction of the carriage, and the catch thus serves to limit the movement of the carriage upon engagement with the shoulder $z^5$. The rod $Z^3$ has fixed to it at one end an operating-handle $Z^4$, by which it can be oscillated, as shown in dotted lines in Fig. 6, thus moving the block $Z^2$ to such extent that the catch $z^4$ passes outwardly of the shoulder $z^5$ and allows a free movement of the carriage to the right. Two stops $z^{10}$, Fig. 40, fixed to the end plate $c^2$, may be provided for limiting the movements of the handle $Z^4$. This construction is useful when it is desired to ordinarily begin a line at a certain fixed point; but to occasionally move to the right of this point to insert a marginal number, &c., it is desirable that the margin-stop shall be adjustable, so that the carriage may be stopped during its retraction at any desired point. In the present construction I effect this by notching the under side of the rod $Z^3$ and providing the block $Z^2$ with a spring catch-lever $Z^5$, which is best shown in Fig. 5. This lever $Z^5$ is preferably angular, as shown, and is pivoted at $z^6$ near its front end to the block $Z^2$. It is formed rearwardly of its pivotal point with a tooth $z^7$, adapted to enter any of the notches of the bar $Z^3$ to hold the block $Z^2$ in its adjusted position. At its front end it is formed with a toe $z^8$, and between this toe and the face of the block $Z^2$ is interposed a flat spring $z^9$, which normally holds the spring-lever $Z^5$ in its operative engaging position. To adjust the stopping-point of the carriage, the lever $Z^5$ is depressed, thus bringing its tooth $z^7$ out of engagement with the notched bar and moving the block along the bar to the desired position, when the lever is released, its spring $z^9$ causing the tooth $z^7$ to enter that notch with which it is then in alinement.

*The shift and key levers.*—My present invention provides certain improvements in the construction of the shift and key levers and their mounting whereby certain advantages are obtained, these improvements being illustrated in Figs. 5, 6, 7, 24, 25, and 26 of the drawings. One feature of improvement relates to means whereby any lever may be removed bodily from the machine without disturbing the others. To this end I form the fulcrum-rod $d$ with a flattened side or sides, so that it is of less diameter in one direction than in another, and I arrange this rod at the rear of the frame, so that normally its longest diameter extends in a vertical direction. Each of the levers is formed at its inner end with a circular recess $d^4$ and a slot $d^5$, leading to this recess. The slot $d^5$ is of sufficient width to admit the lesser diameter of the rod, so that the latter may enter the recess $d^4$, but too narrow to admit the greater diameter of the rod, and the recess $d^4$ is sufficiently large to embrace the greater diameter of the rod. In the construction shown when the rod is turned to the position of Fig. 25 any lever may be moved longitudinally to free it from engagement with the rod, thus permitting the lever to be bodily removed from the machine without removing the fulcrum-rod from its bearings. When the rod $d$ is in the position of Fig. 24, however, all of the levers are securely fulcrumed thereto, their ordinary movements being insufficient to cause their disengagement therewith. It is to be understood that while the levers are shown as fulcrumed at their inner ends the same construction may be advantageously used where the levers are fulcrumed at their middles or at any other suitable point. Instead of forming the rod $d$ with flattened sides throughout its entire length it may be of any desired cross-section and be notched at intervals corresponding to the spacing of the levers, so that it is in effect at these points a flattened rod. I prefer to provide a plate $d^6$, fixed to the rear of the base, as shown in Figs. 5, 6, and 7, which engages the fulcrum-rod $d$ at about its middle between two of the key-levers, whereby the rod $d$ is prevented from springing upwardly. As shown, the plate is formed with a hole encircling the rod $d$, thus allowing rotation of the rod relatively to the plate.

It is necessary that each lever shall after depression be returned to its normal or upper position, and by my present invention I provide an improved means for effecting this result. Heretofore it has been usual to employ a separate spring for each lever and to fix each spring to the main frame of the machine. By my present invention I obtain the advantage of using a separate spring for each lever, but materially reduce the cost and trouble incident to the employment of independently-mounted springs. To this end I form each spring as an integral part of a plate which preferably extends entirely across the machine, being preferably adjustable to vary the tension of the entire series of springs. This is best shown in Figs. 4, 5, 6, and 7, where the spring-plate is designated $D^3$. As shown in Fig. 4, the plate $D^3$ is cut or slotted transversely throughout its entire length in such manner as to form a series of flat springs $D^4$, each of which engages a lever near its fulcrum $d$. As shown, the plate $D^3$ is fixed to a rod or bar $D^5$, which latter may be fulcrumed in the end plates of the base $A'$ of the machine by means of suitable screws or pivots $d^6$. To hold the springs $D^4$ against their respective levers, I preferably employ an arm or arms $d^7$, each of which is fixed to the rod $D^5$ at one end and at its other end engages a projection $d^8$, fixed to the frame, as shown in Figs. 4 to 7. To adjust the tension of the springs $D^4$ against their respective levers, I may employ two or more projections $d^8$, as shown in Fig. 5, whereby the rod $d^7$ may be sprung out of engagement with one and into engagement with another. To maintain the rear ends of the levers equidistantly spaced apart upon their fulcrum-rod $d$, I form the levers and the rigidly-mounted springs $D^4$ with interengaging faces, those shown being notches formed in the free ends of the springs $D^4$ and fitting the under sides of the levers $D$. The springs $D^4$ are stiff in a lateral direction, so as to resist lateral deflection, and I have found that by this means alone the ends of the levers are maintained in their proper positions equidistantly spaced along the fulcrum-rod $d$. This same result may be obviously obtained by forming recesses in the levers and interengaging projections upon the springs. If desired, the tension of any of the individual springs $D^4$ may be increased by bending it upwardly to a greater extent than its fellows or by forming in it a longitudinal rib or groove or otherwise.

The projecting arms $D^2$, carried by the levers, serve to perform two functions. First, they form convenient means for carrying the stop-faces $k$, and, second, by coöperating with the slotted casting G they serve as guides for the levers and hold the front ends of the latter properly spaced apart. When the casting G and projections $D^2$ are formed of considerable depth, as shown, the long guiding-faces thus formed effectively prevent torsion of the levers. This enables me to use a comparatively thin metal for the levers D.

Each of the levers D may be formed with a rib or ribs corrugated or otherwise formed or stamped up to secure additional strength in any manner well known in the art.

It is frequently necessary to supply typewriting machines having characters differing from those in common use to suit the machine for particular kinds of work. In a type-wheel machine this is ordinarily done by carrying a stock of type-wheels having the required characters. It is advantageous, however, that in the body of the machine all the parts should be of a certain fixed standard construction, as unusual constructions involve an increased cost. Frequently a user will have occasion to change the type-wheels upon his machine in order to avail himself of additional or different characters, and under these circumstances it is desirable that the keyboard should be changed to correspond with the type-wheel.

By my present invention I provide a detachable key-button, which may be quickly and securely adjusted over the end of a key-lever or removed therefrom, so that a seller or user may easily conform the keyboard to the type-wheel. This construction is shown at Figs. 44, 45, and 46. As shown, such key-button $D'$ has fixed to its under side a hollow neck $f^2$, which is adapted to fit over the end of a key-lever D, as shown. The neck $f^2$ is formed at its opposite sides with spring-tongues $f^3$, which engage the end of the key-lever and hold the button $D'$ firmly in position thereon, while permitting its ready removal therefrom.

In the construction shown (see Fig. 5 and Figs. 24 to 26) each of the key-levers is formed near its projection $D^2$ with a recess $g^7$, which when a lever is depressed fits over the fulcrum-rod $g^2$ of the differential levers E E', so that this rod does not act to limit the movements of the levers until the several operations performed by each lever are completed. This construction is not an essential one; but it is desirable, in that by it the minimum amount of friction is produced between the levers and differential plate. If the levers were mounted a considerable distance above the fulcrum-axis of the plate and the latter extended upwardly to the proper relative position, a relatively great amount of longitudinal movement of the plate along the under side of the lever would result during a given vertical movement of the plate. Each lever may be curved upwardly, so that its width may be substantially the same throughout its length.

It is desirable that the type-wheel shall not be moved against the platen by the key-levers for printing the period and comma with as great force as by those for printing the other characters. For this reason I provide the projecting arms $D^2$ of these key-levers (shown at the right in Figs. 25 and 26) with a second stop face or shoulder $k^{11}$, which upon depression of the key engages the top face of the shuttle before the differential lever E has acted to move the type-wheel into contact with the platen. When this engagement takes place, the key-lever is locked against further movement, and the type-wheel can only imprint the character by completing its swinging movement by its own momentum against the tension of the springs $b^2$ and $g^3$. This results in a much lighter impression than when the type-wheel is moved positively to the printing-point, as is the case during the printing operation of each of the other characters. As shown, the projections $D^2$ of the period and comma keys correspond in other respects to those of the groups to which they belong.

*The frame.*—My invention provides certain improvements in the frame or body of the machine, some of which are applicable to type-writing machines in general and others of which are especially designed for machines of the character described.

As shown in Fig. 7, the base $A'$ is formed with screw-threaded sockets $A^5$ at its four corners, and each of the standards $A^3$ is formed with a screw-threaded portion $A^6$, designed to screw into one of the sockets $A^5$. The lower ends of the standards $A^3$ extend entirely through and beneath the base, so as to form supports or feet for the latter. I preferably provide a shoe $A^7$, of rubber or other suitable cushioning material, which is formed with a socket to fit over the lower end or foot of each of the standards $A^3$, as shown in Figs. 1 and 6. Near its front side the base A is formed with a transverse slot $a^6$, through which the projecting arms $D^2$ of the key and shift levers extend, and a plate $a^7$, which is formed integrally with the base and serves to support the slotted casting G. One of the standards $A^3$ is formed with a notch $K^6$, before referred to, the upper wall of which serves as a stop or catch for the auxiliary shift-lever $K^4$. The base A at its front side is formed with a downwardly-projecting flange $a^8$, which serves as a stop to limit the upward movement of the key and spacer levers, and I preferably fix to the under face of the flange $a^8$ a pad of felt or other suitable material $a^9$ to receive the impact of the levers. The top plate $A^2$ is fixed to the upper ends of the standards $A^3$ by suitable screws, as shown in Fig. 7. It is formed with a central recess $h^2$, through which the swinging type-wheel frame $b$ extends, this being of sufficient length to permit the movement of the frame during the printing operation. Adjacent to the recess $h^2$ the top plate is formed with a cam-surface $n^6$, which, as before described, serves to actuate the ribbon-feed. At its rear the top plate is formed with a large transverse slot $h^3$, Fig. 7, within which the carriage C moves, and crossing this slot and depending below the main portion of the top plate are two bearing-bridges $h^4$, Fig. 5, to which the dog feed-lever R is fulcrumed. The flange $t'$, which serves as a bearing for the tabular stops, is formed integrally with the top plate along the front side of the slot $h^3$, and the front guideway or path Z for the front carriage-roller is formed as a part of the flange $t'$, extending angularly thereto in a horizontal plane. At the rear of the top plate are formed two or more lugs $h^5$, to which the guide-rod $Z'$ for the carriage is directly fixed by screws or otherwise, as shown in Fig. 7. The top plate thus serves to support the carriage, the feed-dogs, and feed-lever, the mainspring-wheel, the bell, the marginal stop, the line-locking mechanism, and the tabular stops. These parts may thus be removed from the machine by merely removing the top plate. This may be done by removing the type-wheel, detaching the links $R'$ from the feed-lever R and links $l^2$ from detent-levers $l^4$.

In the construction of type-writing machines herein shown I prefer to use a single scale, which may be graduated upon a scale-plate V, shown as fixed to the top plate $A^2$ and best seen in Fig. 38. This scale-plate is shown as comprising two portions $v\ v'$, the one, $v$, coöperating with the pointer $v^2$ during the first half of the complete movement of the carriage and the other, $v'$, coöperating with the pointer $v^3$ during the second half of the movement of the carriage. The portion $v$ of the scale-plate V is therefore provided with graduations beginning at the middle of the machine and reading toward the left, and the portion $v'$ has graduations beginning at its right and preferably with the last number ("35") of the graduations of the portion $v$ and reading in the same direction. In the example shown it is assumed that the carriage has an extreme movement of seventy spaces, and hence the portion $v$ is graduated from "1" to "35," ("1" to "3" being omitted, because the inner ends of both portions of the scale-plate are cut away to permit the movement of the type-wheel to the printing position.) The portion $v'$ is graduated in the same direction from "35" to "70." The pointer $v^2$ thus serves to indicate the positions of the carriage from "1" to "35," and the pointer $v^3$ indicates its positions from "35" to "70." It is not necessary to use a scale in my present machine for determining the printing-point, as the guard-plate $p^6$ serves as a pointer for indicating the position to which any desired point upon the paper should be brought when it is desired to print a character at such point. The upper edge of the scale V serves as a straight-edge for correctly adjusting the paper or for finding the writing-line. The upper edges of the pointers $v^2\ v^3$ may also serve as adjusting-points for the paper.

I preferably provide an additional paper-guide at the front side of the platen, so that the paper may be held about the platen at the printing-point. In the construction shown this comprises a loop or semicircle of wire $v^4$, fixed to the scale-plate by screws $v^5$ and curved rearwardly, so that it extends partially around the platen. This insures that the paper will be held closely against the platen while at the printing position, since the paper-guide $v^4$ is stationary and acts upon that part of the paper which is then opposite the type-wheel.

It is frequently necessary to make corrections in manifold copies, and heretofore, so far as I am aware, no means have been provided for supporting a sheet of carbon-paper in position between the printing mechanism and the platen. I therefore provide a holder which may be conveniently utilized for supporting a slip of carbon-paper between the printing mechanism and the platen, this holder being shown as comprising two vertical arms $v^6$ and preferably formed by the ends of the paper-guards $v^4$. This is done by passing the ends of the wire downwardly a suitable distance and then bending them upwardly, as shown, for instance, in Fig. 5.

It will be understood that various modifications of the device shown may be employed without departing from the spirit of my invention. For instance, I may employ a sector or other type-carrier in the construction shown instead of a type-wheel. Neither is it essential that the shuttle mechanism should be of the precise construction shown.

The rack $e$ admits of many modifications, three of which are shown in Figs. 48 to 53.

In Figs. 48 and 49 the two sectors are so arranged that they lie in the arcs of circles struck from the centers of their respective studs $e^2$ instead of in the arcs of circles struck from the opposite studs. The guide-slot $f'$ instead of being continuous, as in Figs. 12 to 18, is divided, as shown, and a small anti-friction-roller is preferably mounted to bear upon the rear of the rack, as indicated at $f^{11}$. Otherwise the construction and operation are similar to those of the preferred form.

In Figs. 50 and 51 the rack $e$ is formed with exterior teeth and engages the pinion $c$ at front instead of at rear, as in Figs. 12 and 13. The use of this construction necessitates a rearrangement of the shuttle mechanism, inasmuch as the pinion $c$ revolves in a direction opposite to that of Figs. 12 to 14. This may be compensated for by arranging the rack $i$ of the shuttle so that it engages the pinion at its rear instead of at front, as shown.

It is not essential that the rack $e$ should be adapted to move about two fulcrum-axes, although this construction is preferred. In Figs. 52 and 53 I have shown a rack adapted to move about a single fixed axis $e^{11}$. In this construction the sector lies in the arc of a circle of which the axis $e^{11}$ is a center. The links $h\ h'$ are connected to arms $h^{11}$, as shown, and thus effect the movements of the rack. The rack normally occupies the central position shown and is moved to rotate the gear $c$ to the right or left, according as the link $h$ or $h'$ is moved by its respective differential lever. Other suitable conformations of rack may be employed, if desired.

I do not herein claim those features of my invention which relate to the inking mechanism, the general carriage mechanism, or the special construction of the carriage-frame and its accessory parts, as these are respectively claimed in the following divisional applications: Serial No. 37,231, filed November 21, 1900, (renewed December 30, 1902, Serial No. 137,208;) Serial No. 42,133, filed January 4, 1901, (renewed December 30, 1902, Serial No. 137,209,) and No. 160,306, filed June 6, 1903.

I claim as my invention the following-defined novel features, substantially as hereinbefore specified, namely:

1. In a type-writing machine, a type-wheel, a type-wheel frame, a series of key-levers, and a member for rotating said type-wheel connected to said levers, said member adapted to oscillate transversely to the axis of said type-wheel and about an axis which is non-coincident with the axis of movement of the type-wheel frame.

2. In a type-writing machine, a type-wheel adapted to oscillate toward and from the printing position to perform the printing operation, a pinion for rotating it, and a rack for operating said pinion, said rack adapted to oscillate transversely to the axis of said type-wheel and about an axis non-coincident with the axis of oscillation of the type-wheel.

3. In a type-writing machine, a type-wheel, a movable type-wheel frame, a pinion for rotating said wheel, and a single rack supported upon the type-wheel frame for operating said pinion having two opposite movements to rotate said type-wheel in either direction from its normal position, to bring it to the printing position.

4. In a type-writing machine, the combination of a type-wheel, with a member for rotating it comprising a single piece adapted to turn about two separate axes for turning the type-wheel in opposite directions from its normal position.

5. In a type-writing machine, the combination of a type-wheel, a pinion for rotating it, and an oscillating rack connected with the pinion, said rack adapted to turn about two separate axes for operating the pinion to turn the type-wheel in opposite directions from its normal position.

6. In a type-writing machine, the combination of a type-wheel, with a means for rotating it adapted to turn about two separate axes, and connections between such means and two series of key-levers arranged to turn said means about one axis when moved by a key-lever of one series, and about the other axis when moved by a lever of the other series.

7. In a type-writing machine, the combination of a type-wheel, a pinion for rotating it, and a rack for operating said pinion, said rack adapted to turn about two separate axes, and connections between the rack and two series of key-levers, arranged to turn the rack about one axis when moved by a key-lever of one series, and about the other axis when moved by a lever of the other series.

8. In a type-writing machine, the combination of a type-wheel, a pinion for rotating it, and a rack for moving said pinion, said rack connected to one series of key-levers at one point, and to another series of key-levers at another point, and carrying a pivot at each point of connection, whereby when the rack is moved by either series of levers, it rotates about the pivot connected to the other series.

9. In a type-writing machine, the combination of a type-wheel, a pinion for rotating it, a rack for operating said pinion, a swinging frame carrying said parts, a stop device for limiting the movement of the type-wheel, and means operated by the key-levers for moving the rack, interposing said stop device, and swinging said frame, whereby the wheel is rotated to a predetermined extent, and then swung to the printing position.

10. In a type-writing machine, a type-wheel, a pinion for rotating it, a rack for moving said pinion, carrying a pin at each side, a guide for said rack formed with guide-grooves into which said pins extend, means connecting each of said pins with a separate series of key-levers, whereby in operating either series the rack is moved about the fulcrum formed by the pin connected to the other series.

11. In a type-writing machine, the combination of a type-wheel, a pinion for rotating it, and a rack for moving said pinion, said rack adapted to rotate about two pivotal axes, and having its active portions formed in the arcs of circles struck from said pivotal axes.

12. In a type-writing machine, the combination of a type-wheel, a pinion for rotating it, a rack for rotating said pinion in either direction, a rocking frame carrying said parts, a lever for moving said rack and frame, and means whereby said lever is moved to varying positions by the different key-levers.

13. In a type-writing machine, the combination of a type-wheel, a pinion for rotating it, a rack for rotating said pinion, a lever connected to the key-levers for moving said rack, and a connection between said rack and lever permitting a predetermined amount of lost motion between said parts.

14. In a type-writing machine, the combination with a series of key-levers fulcrumed to the frame and a type-wheel, of a rocker located in the path of movement of said levers, having active portions engaging said levers at different distances from the respective fulcrums of said rocker and levers, whereby the several levers act at varying leverage on said rocker, and hence rock it to varying degrees, and means for communicating the movements of the rocker to the type-wheel.

15. In a type-writing machine, the combination with a series of key-levers, and a type-wheel, of a plate connected to said type-wheel, and so formed as to be moved a different distance by each of said levers, and means for adjusting the engaging points of said plate with said levers.

16. In a type-writing machine, the combination with a series of key-levers, and a type-wheel, of a plate connected to said type-wheel, and so formed as to be moved a different distance by each of said levers, and means for adjusting the engaging points of said plate with said levers with relation to the fulcrums of the latter.

17. In a type-writing machine, the combination with a type-wheel, of a series of key-levers for moving the type-wheel in one direction divided into a succession of groups, and means whereby the key-levers of a group act to move the type-wheel to an extent which is at variance with their successive positions in such group.

18. In a type-writing machine, the combination with a type-wheel, of a series of key-levers divided into groups, and means whereby the key-levers occupying like positions in said groups act to impart to the type-wheel successively-increasing movements.

19. In a type-writing machine, the combination with a series of key-levers divided into groups, and a type-wheel, of a differential plate adapted to be moved by said levers, said plate having a plurality of similar engaging faces of different degrees of projection arranged in successive order lengthwise of said plate, each of which faces is adapted to be engaged by a group of key-levers.

20. In a type-writing machine, the combination with a series of key-levers divided into groups, and a type-wheel, of a differential plate adapted to be moved by said levers, said plate having a plurality of engaging faces, each of which faces is adapted to be engaged by a group of key-levers, and said faces so formed that the levers occupying like positions in the several groups act with successively-increasing effect upon the plate.

21. In a type-writing machine, the combination with a series of key-levers, a type-wheel and a swinging frame carrying said type-wheel, of a differential plate located beneath said levers, and adapted to be engaged thereby, and connections between said plate and said type-wheel and swinging frame, whereby the depression of a key first effects the rotation of the type-wheel, and then moves the latter to the printing position.

22. In a type-writing machine, the combination with a series of key-levers, and a type-wheel, of a plate connected to said type-wheel, and so formed as to be moved a different distance by each of said levers, a fulcrum-rod for said plate held in the frame, and a detachable connection between said plate and rod whereby the plate may be separated from said rod without removing the latter.

23. In a type-writing machine, the combination with a type-wheel, and a gear-wheel rotating therewith, said gear-wheel having a tilting movement during the printing movement of the type-wheel, of a shuttle meshing with said gear-wheel and having concave teeth, whereby said shuttle remains in mesh with said gear-wheel during said tilting movement of the latter.

24. In a type-writing machine, the combination with a type-wheel, and means for rotating it, of a shuttle having movements corresponding to those of the type-wheel, stops moved by the type-levers into the path of the shuttle, for limiting the movement of the type-wheel, and means for arresting the shuttle in its normal position after each printing movement of the wheel.

25. In a type-writing machine, the combination with a type-wheel, and means for rotating it, of a shuttle having movements corresponding to those of the type-wheel, stops moved by the type-levers into the path of the shuttle, for limiting the movement of the type-wheel, stops for arresting the shuttle after each printing movement of the wheel, and means moved by the type-levers for moving one of said last-named stops before the next succeeding printing movement of the wheel.

26. In a type-writing machine, the combination of a shuttle having means for propelling it, and having a plurality of stop projections, with a series of stops moved by the respective key-levers, for arresting the shuttle at different points, said stops divided into groups, those of each group moving into the path of one of said stop projections.

27. In a type-writing machine, the combination with a shuttle, and means for propelling it, of a series of stops for limiting its movement spaced apart a distance which is a multiple of the unit-spaces through which the shuttle must move, and divided into groups, the shuttle having as many stop-faces as the number of groups, the stops of each group arranged to be projected into the path of their appropriate stop-face, and the stop-faces separated by a distance equaling the width of one group less one unit-space, whereby the stoppage of the shuttle for successive unit-spaces is effected by stops of successive groups repeated through the groups to the end of the series.

28. In a type-writing machine, the combination with a type-wheel, and means for rotating it, of a shuttle having movements corresponding to those of the type-wheel, and having a plurality of stop projections, and a plurality of stops moved by the key-levers, and divided into groups, those of each group moving into the path of one of said projections to limit the movement of the shuttle and the rotation of the type-wheel.

29. In a type-writing machine, the combination with a type-wheel, and means for rotating it, of a shuttle having movements corresponding to those of the type-wheel, and having a plurality of stop projections, a series of key-levers, a stop moved by each of said key-levers into the path of the shuttle, said key-levers and stops being divided into groups, the stops of the respective groups being adapted to engage the respective stop projections of the shuttle.

30. In a type-writing machine, the combination with a printing mechanism, and means for operating it, of a shuttle moved by said printing mechanism, a stationary race formed to receive said shuttle so that the latter may move bodily within it, and a series of stops for arresting the shuttle at different points.

31. In a type-writing machine, the combination with a printing mechanism, a gear moved by said mechanism, a shuttle meshing with said gear, and an antifriction-roller for holding said shuttle in engagement with said gear.

32. In a type-writing machine, the combination with a type-wheel, a shaft for carrying said wheel having a vertical movement, and a gear rotating with said shaft having a movable connection therewith, of a frame for carrying said parts, and having stops for preventing vertical movement of said gear.

33. In a type-writing machine, the combination of a type-wheel, means for rotating it, a swinging frame carrying said parts, a spring adapted to retract said swinging frame, a relatively fixed support, and a roller carried by said support around which said spring passes.

34. In a type-writing machine, the combination of a type-wheel, means for rotating it, a swinging frame carrying said parts, a spring adapted to retract said swinging frame, a relatively fixed support, a roller carried by said support around which said spring passes, and means for adjusting the tension of said spring.

35. In a type-writing machine, the combination of a type-wheel, two levers operated by the key-levers for rotating said type-wheel through intermediate connections, a spring having its ends fixed to said levers, and a roller around which said spring passes.

36. In a type-writing machine, the combination of a type-wheel, two levers operated by the key-levers for rotating said type-wheel through intermediate connections, a spring having its ends fixed to said levers, a roller around which said spring passes, and means for adjusting the tension of said spring.

37. In a type-writing machine, the combination with a type-wheel, and a shaft for said wheel adapted to move said wheel to the printing position, means for rotating said wheel to present the proper character, and means holding said shaft in its retracted position during such rotation.

38. In a type-writing machine, the combination with a type-wheel, and a shaft for said wheel adapted to move said wheel to the printing position, means for rotating said wheel to present the proper character, and means holding said shaft in its retracted position during such rotation, comprising a detent for preventing movement of said shaft to the printing position, and means for releasing said detent upon a predetermined depression of a key-lever.

39. In a type-writing machine, the combination with a series of key-levers, a type-wheel and means operated by said key-levers for rotating said type-wheel and moving it to the printing position, of a frame carrying said wheel, a detent for engaging such frame during rotation of the wheel, and means operated by said key-levers for disengaging said detent upon a predetermined movement of said levers.

40. In a type-writing machine, the combination with a series of key-levers, a type-wheel, a shaft for said wheel, a swinging frame carrying said shaft, a gear fixed to said shaft, a rack for rotating said gear, and levers for moving said rack connected to said key-levers, a detent adapted to engage said frame with a certain lost motion, and movable out of engagement therewith by said levers, said lost motion allowing a movement of the shaft toward the printing position before engagement of said detent and frame.

41. In a type-writing machine, the combination of a fixed frame, a series of key-levers, a type-wheel, a shaft carrying said wheel, a swinging frame carrying said shaft, a gear fixed to said shaft, a rack for rotating said gear, and rack-levers operated by said key-levers for moving said rack, of a detent mechanism for holding said type-wheel during rotation thereof, comprising a detent-lever pivoted to said fixed frame, a detent carried by said lever and engaging said swinging frame, and a universal bar below said key-levers, connected to said detent-lever, whereby said lever is depressed upon a predetermined movement of said key-levers with the effect that the detent is moved out of engagement with said swinging frame.

42. In a type-writing machine, the combination with a series of key-levers, a type-wheel and means operated by said key-levers for rotating said type-wheel and moving it to the printing position, of a frame carrying said wheel, a detent for engaging such frame during rotation of the wheel, and means operated by said key-levers for disengaging said detent upon a predetermined movement of said levers, said frame having a pivoted projecting catch adapted to engage said detent, whereby during backward movement of the wheel said catch will move past said detent to again engage therewith.

43. In a type-writing machine, the combination of a type-wheel, a pinion for rotating it, a rack for operating said pinion, a swinging frame carrying said parts, a star-wheel moving with said type-wheel, a laterally-rigid projection adapted to be engaged by said star-wheel, whereby when the type-wheel is moved to the printing position said star-wheel is engaged by said projection to prevent the vibration of said type-wheel.

44. In a type-writing machine, the combination with a type-wheel, of a rock-shaft, a shift-key adapted to rock said shaft, a cam fixed to said shaft, and an intermediate lever operated by said cam for shifting said type-wheel.

45. In a type-writing machine, the combination with a type-wheel, of a shift-key, and a shift-lever connected to said type-wheel, a cam operated by said shift-key to move said lever, a rock-shaft, an auxiliary shift-lever for rotating said rock-shaft, a connection between said shaft and shift-lever for moving the latter, and a stop for holding said auxiliary lever in its depresssed position.

46. In a type-writing machine, the combination with a frame, and a type-wheel, of a shift-lever connected to said wheel, a rock-shaft connected to said shift-lever for moving it, an auxiliary spring-lever for rotating said shaft, and a stop formed in said frame, whereby said type-wheel may be shifted and said spring-lever sprung into said stop for holding said wheel in its shifted position.

47. In a type-writing machine, the combination with a frame, a type-wheel, a shift-lever pivoted to said frame, and connected to said type-wheel, and means for moving said shift-lever to move said type-wheel to its shifted position, and normally holding it in such position, of a reversing shift-key, and a cam operated by said key for retracting said shift-lever to return said type-wheel to its normal position against the action of said first-named means.

48. In a type-writing machine, the combination with a frame, a type-wheel, and a shift-lever connected to said wheel, of a rock-shaft pivoted in said frame, and connected to said shift-lever for operating it, an auxiliary lever for rotating said shaft for shifting said type-wheel, and holding it in its shifted position, a sleeve on said shaft, a cam on said sleeve, and a shift-key adapted to operate said cam to shift said type-wheel independently of the operation of said first-named means.

49. In a type-writing machine, the combination with a frame, a type-wheel and a shift-lever connected to said wheel, of a rock-shaft pivoted in said frame, and connected to said shift-lever for operating it, an auxiliary lever for rotating said shaft for shifting said type-wheel and holding it in its shifted position, a sleeve on said shaft, a cam on said sleeve, a shift-key adapted to operate said cam to shift said type-wheel independently of the operation of said first-named means, and a second sleeve on said shaft, a second cam fixed to said sleeve and a reversing shift-key for operating said second cam to move said shift-lever and wheel to their normal positions.

50. In a type-writing machine, a hollow rubber type-wheel, having a separably-formed hub molded therein, said wheel contacting with said hub only at its ends.

51. In a type-writing machine, a hollow rubber type-wheel having a hub molded therein, said hub having enlarged portions between the end walls of said wheel for contacting with said walls.

52. In a type-writing machine, the combination with a type-wheel, of a shaft extending through said wheel and having a stop beneath said wheel, and a spring acting against the upper side of said wheel.

53. In a type-writing machine, the combination with a type-wheel, of a shaft extending through said wheel and having a stop for limiting the downward movement of the wheel, a spring-washer above said wheel, and a cotter-pin passing through said shaft for holding said washer against said wheel.

54. In a type-writing machine, the combination of a type-carrier of such curvature as to contact more than one of its type with the paper during printing, and arranged to impress the printing character in such position that the character on one side thereof is so separated from the paper as not to print, while that on the other side so approaches the paper as would make an impression, with an interposed shield for preventing the impression of the latter character against the paper.

55. In a type-writing machine, the combination with the platen, and a type-wheel movable against the platen, of means whereby one side of each character contacts with the platen slightly in advance of the other, and means for preventing the impression of the next succeeding character.

56. In a type-writing machine, the combination with the platen, of a type-wheel movable against the platen, said type-wheel being so adjusted that one side of each character contacts with the platen slightly in advance of the other side, and means for preventing contact with the platen of the next succeeding character on said wheel.

57. In a type-writing machine, the combination with the platen, of a type-wheel movable against the platen, said type-wheel being so adjusted that one side of each character contacts with the platen slightly in advance of the other side, and an interposed guard for preventing contact with the platen of the next succeeding character on said wheel.

58. In a type-writing machine, the combination with the platen, of a type-wheel movable to contact with the platen, said type-wheel being so adjusted that one side of each character contacts with the platen slightly in advance of the other side, and means for preventing contact with the platen of the next succeeding character on said wheel, comprising a spring-plate interposed in proper position between said wheel and platen.

59. In a type-writing machine, the combination with a series of key-levers, of tension-springs for said key-levers, comprising a plate $D^3$ having a series of spring-arms $D^4$ integral therewith, each bearing against one of said levers, and means for varying the position of said plate to adjust simultaneously the tension of all said spring-arms.

60. In a type-writing machine, the combination with a frame, and a series of key-levers, of a rock-shaft carrying a series of spring-arms, each bearing against one of said levers, and an arm fixed to said shaft and bearing against said frame, for holding said springs under tension.

61. In a type-writing machine, the combination with a frame and a series of key-levers, of a rock-shaft carrying a series of spring-arms, each bearing against one of said levers, an arm fixed to said shaft for holding said springs under tension, and an adjustable projection carried by the frame for holding said arm.

62. In a type-writing machine, a slotted casting carried by the frame and a series of key-levers extending transversely of said casting, and an arm extending from each of said levers moving in one of the slots of said casting, whereby said key-levers are guided in their movements.

63. In a type-writing machine, a slotted casting fixed to the frame, a series of key-levers extending transversely of said casting, each having an arm moving in one of the slots of said casting, each of said arms formed with a stop-face, a printing mechanism, and a shuttle having movements corresponding with those of the printing mechanism, said stop-faces upon said arms being adapted during the movement of the key-lever to be interposed in the path of movement of said shuttle.

64. In a type-writing machine, the combination with a key-lever, having a projecting rectangular end, of a key-button having a correspondingly-shaped socket at its under side, adapted to fit the end of said key-lever, and having a spring-tongue adapted to engage said lever, whereby said parts may be separably connected.

65. In a type-writing machine, the combination of the base having screw-threaded sockets, a plurality of standards screwing through said sockets and extending below the base to form supports therefor, and rubber feet for said standards.

66. In a type-writing machine, the combination with a base, a top plate, a series of key-levers supported by said base, a type-wheel, and supports therefor supported on the upper side of said base and projecting through said top plate, the latter having an aperture formed therein for allowing the movement of said supports within it.

67. In a type-writing machine, the combination with a base, a top plate, a series of key-levers supported by said base, a type-wheel, supports therefor supported upon the upper side of said base and projecting through said top plate, and a carriage, said top plate carrying said carriage and having an aperture formed therein allowing the movement of said supports within it.

68. In a type-writing machine, the combination with a series of key-levers, having arms, and a slotted casting forming guides for said arms, of a base supporting said levers and casting, and formed with a slot below said casting through which said arms extend.

69. In a type-writing machine, the combination of a series of key-levers, a fulcrum-rod on which they turn and on which they may slide laterally, and means for preventing lateral displacement of the fulcrum ends of said levers comprising rigidly-mounted leaf-springs for said levers connected therewith and adapted to resist lateral deflection.

70. In a type-writing machine, the combination of a series of key-levers, a fulcrum-rod on which they turn and on which they may slide laterally, and means for preventing lateral displacement of the fulcrum ends of said levers comprising rigidly-mounted leaf-springs for said levers connected therewith and adapted to resist lateral deflection, the lateral stiffness of said springs alone being sufficient to prevent such lateral displacement of the ends of the levers.

71. In a type-writing machine the combination with a series of key-levers divided into groups, and a type-wheel, of a plate in the path of movement of said levers having its active portions arranged with respect to said levers to be displaced to a varying extent by each of the levers of one group, and to be displaced to a different extent by each group of levers, and means for communicating the movements of the plate to the type-wheel.

72. A platen, a type-wheel support made to move toward the platen to print, a shaft mounted on said support, a pinion carried by said support, means for rotating said pinion, a rack actuated by the pinion, a stop or stops for the rack, and a lock for preventing premature printing movement of the type-wheel support.

73. A platen, a type-wheel support made to move toward the platen to print, a shaft mounted on said support, a pinion carried by said support, means for rotating said pinion, a rack actuated by the pinion, a stop or stops for arresting the rack to position the letter to be printed, a lock for preventing premature printing movement of the type-wheel support, and keys for actuating the pinion and stops and releasing the lock.

74. In a type-writer, a rotatable type-carrier having a shaft extending to the bottom of the machine, means to rotate said shaft and carrier, a gear on the lower portion of said shaft, and a rack engaged by said gear and adapted to travel transversely of the machine, said rack having a stop on its front and pivoted key-levers in position to be operatively engaged one at a time with said stop.

In witness whereof I have hereunto signed my name in the presence of two subscribing witnesses.

RICHARD W. UHLIG.

Witnesses:
EUGENE V. MYERS,
AGNES I. DUNN.